United States Patent
Dasys et al.

(10) Patent No.: US 11,028,681 B2
(45) Date of Patent: Jun. 8, 2021

(54) EXPLORATIVE SAMPLING OF NATURAL MINERAL RESOURCE DEPOSITS

(71) Applicant: 1789703 Ontario Ltd., Sudbury (CA)

(72) Inventors: Andrew Dasys, Sudbury (CA); Nehme Bilal, North Vancouver (CA)

(73) Assignee: 1789703 Ontario Ltd., Sudbury (CA)

( * ) Notice: Subject to any disclaimer, the term of this patent is extended or adjusted under 35 U.S.C. 154(b) by 0 days.

(21) Appl. No.: 16/063,117

(22) PCT Filed: Dec. 16, 2016

(86) PCT No.: PCT/CA2016/051494
§ 371 (c)(1),
(2) Date: Jun. 15, 2018

(87) PCT Pub. No.: WO2017/100936
PCT Pub. Date: Jun. 22, 2017

(65) Prior Publication Data
US 2019/0226314 A1  Jul. 25, 2019

(30) Foreign Application Priority Data

Dec. 18, 2015 (CA) .............................. CA 2915802

(51) Int. Cl.
*E21B 43/30* (2006.01)
*G06Q 10/04* (2012.01)
(Continued)

(52) U.S. Cl.
CPC .......... *E21B 43/30* (2013.01); *E21B 41/0092* (2013.01); *G06Q 10/04* (2013.01);
(Continued)

(58) Field of Classification Search
CPC ........ E21B 43/30; E21B 41/0092; E21B 7/04; G06Q 10/04; G06Q 10/06375; G06Q 10/067; G06Q 50/02
See application file for complete search history.

(56) References Cited

U.S. PATENT DOCUMENTS 6,711,529 B1    3/2004  Thore
7,542,037 B2 *  6/2009  Fremming ............... G01V 1/30
                                                                    345/420
(Continued)

FOREIGN PATENT DOCUMENTS

| CA | 2787851 A1 | 8/2011 |
| WO | WO-2009/080711 A2 | 7/2009 |
| WO | WO-2011/096964 A1 | 8/2011 |

OTHER PUBLICATIONS

International Application No. PCT/CA2016/051494, International Search Report and Written Opinion, dated Mar. 7, 2017.

*Primary Examiner* — Silvana C Runyan
(74) *Attorney, Agent, or Firm* — Marshall, Gerstein & Borun LLP

(57) ABSTRACT

Methods and systems for improving mineral resource exploration and resource classification efficiency are provided herein. The generation and iterative, dynamic improvement of drill plans for sampling a target volume using drill holes is described. Methods and systems for the development and optimization of drill plans are able to accommodate a wide variety of constraints and targets, providing drill plans which aim to minimize the amount of explorative drilling while substantially converting unclassified sub-volumes, and in particular high-desirability sub-volumes, of the target volume to a specified or desired level while attempting to maximize targeted resource conversion efficiency. Resulting drill plans may provide a proposed collection of drill holes, defined in 3D space, penetrating the target volume which
(Continued)

sufficiently sample a target volume while remaining within one or more specified constraints.

18 Claims, 16 Drawing Sheets

(51) Int. Cl.
*G06Q 10/06* (2012.01)
*G06Q 50/02* (2012.01)
*E21B 41/00* (2006.01)
*E21B 7/04* (2006.01)

(52) U.S. Cl.
CPC ..... *G06Q 10/067* (2013.01); *G06Q 10/06375* (2013.01); *G06Q 50/02* (2013.01); *E21B 7/04* (2013.01)

(56) References Cited

U.S. PATENT DOCUMENTS

| | | | |
|---|---|---|---|
| 7,552,406 B2 * | 6/2009 | Johnson | G06F 17/5036 703/1 |
| 2013/0140037 A1 * | 6/2013 | Sequeira, Jr. | E21B 7/04 166/369 |

* cited by examiner

EXPLORATIVE SAMPLING OF NATURAL MINERAL RESOURCE DEPOSITS

FIELD OF INVENTION

The present invention relates generally to methods and systems relating to explorative sampling of target volumes. More specifically, the present invention relates to methods and systems for the development of drill plans for sampling a target volume such as a potential or existing mining site or mineral resource deposit.

BACKGROUND

Mining and natural resource recovery typically involves the identification and characterization of natural resource deposits. Developing an understanding of the size, shape, positioning of natural mineral resource deposits within a target volume, mineral content, and as well as an understanding of any geological features of the target volume such as contacts, faults, and other geological structures or features, can be highly useful for natural resource recovery operations such as mining. Natural resource deposits are, however, often located deep underground, difficult to access, and difficult to assess. As such, significant difficulty and expense is often associated with the identification and characterization of potential natural resource deposits.

Traditionally, exploratory drill holes have been used to sample target volumes in an effort to better understand potential natural resource deposits. These drill holes are typically long drill holes which penetrate the target volume, recovering samples of the target volume which when analysed provide information about the region of the target volume through which the drill hole passes. This information is then used to create an estimate of the mineral content of the complete volume, and to identify the location of geological structures, contacts, and faults. These may be used to bound the volume. Exploratory drilling can be quite expensive and as such, it is desirable to minimize the number and/or total length of drill holes used, and avoid drilling holes from positions which are costly, time consuming, or otherwise difficult to access or drill.

Conventionally, exploratory drilling operations have been designed by manual analysis and selection of drill hole placement and orientation at a target volume. Efforts are made to efficiently sample the target volume, however manual analysis and selection can be time consuming, and often does not identify optimized or near optimized solutions for drill hole placement and orientation. Although advances have since been made in the development and optimization of exploratory drilling plans, this still remains a significant challenge in the field.

Examples of methods and techniques used for the exploratory investigation of mineral deposits are described in, for example, *Prospecting and Exploration of Mineral Deposits* (Bohmer and Kucera, Elsevier, Developments in Economic Geology (21), $2^{nd}$ Ed., 1986), which is herein incorporated by reference in its entirety.

Alternative, additional, and/or improved methods and systems for developing explorative sampling drill plans for investigating natural resource deposits is desirable.

SUMMARY OF INVENTION

In an embodiment, the invention provides a method for improving mineral resource exploration and resource classification efficiency, said method comprising:

defining a one or more target volumes of interest in 3D space;

segmenting the one or more target volumes into sub-volumes to which one or more attributes indicating relative desirability may be assigned; and using an algorithmic solver to iteratively or programmatically generate and improve a drill plan which aims to provide an optimal or near optimal solution for drill hole distribution within the one or more target volumes such that all or nearly all the sub-volumes, or at least the sub-volumes of greatest desirability, of the one or more target volumes are sampled to a specified or desired level;

wherein the resulting drill plan comprises a collection of one or more planned drill holes which are defined in 3D space, and wherein a set of operational constraints constrains the iteratively or programmatically generated and improved drill plan.

In another embodiment of a method as described above, the drill holes of the drill plan may be characterized by collar (start 3D coordinates) and either a trace for deviated holes or a dip/azimuth and length for straight holes.

In another embodiment of a method as described above, the set of operational constraints may comprise a historical drill hole locations constraint, a potential drilling setup location constraint, a drilling direction constraint, a drilling dips constraint, a drilling azimuth constraint, a drilling budget constraint, a sampling requirement constraint, a drilling setup availability constraint, a constraint regarding distribution of drill holes from setups, a constraint regarding the total amount of surface ground disturbance, a topographical constraint, an environmental constraint, a constraint regarding environmental exclusion zones, a geological fault constraint, a geological contacts constraint, a geological structure constraint, or a constraint regarding existing underground workings or operations, or any combination thereof.

In still another embodiment of any of the method or methods described above, the set of operation constraints may comprise a potential drilling setup location constraint, a drilling dip constraint, and a drilling azimuth constraint.

In yet another embodiment of any of the method or methods described above, the algorithmic solver may be based on a heuristic or linear algorithm; a metaheuristic algorithm; a metaheuristic SCP algorithm; a localized random search; a modified random search; a taboo search; or an annealing algorithm.

In another embodiment of any of the method or methods described above, the one or more attributes indicating relative desirability of a sub-volume may be selected from one or more of:

distance of the sub-volume from an existing or planned drill hole;
estimate variance;
grade estimates;
mining development or production schedules and timing;
bounding of the sub-volume by site specific geological contacts, structures, or faults;
variability or uncertainty of sub-volume grade estimation or interpolation;
or any combination thereof.

In still another embodiment of any of the method or methods described above, the drill plan may aim to sample sub-volumes of the one or more target volumes such that a highest aggregate desirability is achieved.

In yet another embodiment of any of the method or methods described above, the aggregate desirability may primarily consider the value of resource classification, the decrease in estimation uncertainty, the identification of geological features bounding the one or more target volumes, or a combination thereof.

In another embodiment of any of the method or methods described above, the drill plan may be constrained by a budget which limits aggregate drill hole length.

In yet another embodiment of any of the method or methods described above, the drill plan may be iteratively improved by improving the global distribution of drill holes within the drill plan based on newly acquired information as drilling or sampling operations progress.

In a further embodiment of any of the method or methods described above, the specified or desired level may be selected from a range spanning geological, inferred, indicated, measured resource, and probable or proven reserve.

In yet another embodiment of any of the method or methods described above, the specified or desired level may be at least about 60% indicated (or at least about another desired % value or range suitable for the particular application), while minimizing measured classification.

In still another embodiment of any of the method or methods described above, the sub-volumes may be blocks, and the algorithmic solver may aim to generate a drill plan which attempts to maximize the number of blocks sampled by the drill holes of the drill plan while minimizing the total planned drill length of the drill plan.

In another embodiment of any of the method or methods described above, the algorithmic solver may aim to generate a drill plan which attempts to maximize the number of sub-volumes sampled or classified per unit (for example, $m^3/m$) of planned drill length.

In a further embodiment of any of the method or methods described above, the drill plan may provide a ranking for each planned drill hole which is based on the relative value of each planned drill hole to the overall drill plan.

In still another embodiment of any of the method or methods described above, one or more of the lowest ranked drill holes may be eliminated from the drill plan.

In a further embodiment of any of the method or methods described above, the ranking may include a penalty for moving a drill hole of the drill plan away from a position at the one or more target volumes which is easily drilled, or away from a position at the one or more target volumes at which drilling equipment is already located.

In still another embodiment of any of the method or methods described above, the value to the drill plan of changing one or more collar locations while dynamically updating collaring dip and azimuth direction may be assessed. In certain embodiments, such methods may be considered as including a localized optimization.

In yet another embodiment of any of the method or methods described above, the algorithmic solver may be based on a multiple metaheuristic algorithm comprising a genetic algorithm component, a tabu search algorithm, and an iterated local search algorithm.

In still another embodiment of any of the method or methods described above, the iteratively generated drill plans may be scored by a resource conversion calculator, and the algorithmic solver may improve the drill plan score using one or more parameters which are changed using a constraint modifier between iterations.

In a further embodiment of any of the method or methods described above, the constraint modifier may change or flex the specified or desired level, one or more parameters selected from:

a historical drill hole locations constraint; a potential drilling setup location constraint; a drilling direction constraint; a drilling dips constraint; a drilling azimuth constraint; a drilling budget constraint; a sampling requirement constraint; a drilling setup availability constraint; a constraint regarding distribution of drill holes from setups, a constraint regarding the total amount of surface ground disturbance; a topographical constraint, an environmental constraint; a constraint regarding environmental exclusion zones; a geological fault constraint; a geological contacts constraint; a geological structure constraint; a constraint regarding existing underground workings or operations; or any combination thereof, or a combination thereof, between iterations.

In still another embodiment of any of the method or methods described above, the scoring of the drill plans may include rewarding drill plans which provide information about the location of geological structures and contacts of the one or more target volumes, or rewarding drill holes which have a reasonable probability of success.

In yet another embodiment of any of the method or methods described above, the method may be an iterative method which is repeated using input which is based on newly acquired information obtained from drilling one or more planned drill holes from a previously generated drill plan.

In still another embodiment of any of the method or methods described above, the one or more planned drill holes from the previously generated drill plan may be drill holes which have been drilled quickly but with reduced regard for precision for geological drilling or bounding of the one or more target volumes, allowing in-fill planning, and improving the drill plan with less invested time.

In a further embodiment of any of the method or methods described above, the orientation of a drill hole of the drill plan may be recalculated in real-time to accommodate for on-site drilling limitations.

In still another embodiment of any of the method or methods described above, the on-site drilling limitations may be at least one of drill site accessibility, drill hole geometry, drill hole timing limitations, a requirement for movement of a drill rig, setup availability, or any combination thereof.

In yet another embodiment of any of the method or methods described above, the drill plan may be a dynamic solution which can be recalculated as drill hole information is acquired.

In a further embodiment of any of the method or methods described above, a completion constraint may be used to identify a point at which sufficient drilling has been completed.

In still another embodiment of any of the method or methods described above, the point at which sufficient drilling has been completed may be a point at which further increase in drill hole density or length provides additional value which is below a specified threshold.

In a further embodiment of any of the method or methods described above, the method may further comprise:

using implicit modeling to model geological structures, contacts, faults, shells, surfaces, or a combination thereof, of the one or more target volumes; and updating the implicit modeling as sampling data is acquired, thereby dynamically identifying high-value sub-volumes to be converted from unclassified to geological, inferred, indicated, or measured.

In still another embodiment of any of the method or methods described above, the drill plan may be recalculated, and the scoring of the resulting drill plan may include a reward for solutions which allow for conversion of the identified high-value sub-volumes from unclassified to inferred, indicated or measured.

In yet another embodiment of any of the method or methods described above, the drill plan may attempt to minimize the total length of drill holes that are used for conversion of the one or more target volumes from unclassified to geological, inferred, indicated, or measured.

In another embodiment of any of the method or methods described above, information obtained from measurement while drilling (MWD) apparatus may be used by the algorithmic solver when generating the drill plan.

In another embodiment of any of the method or methods described above, drill holes of the drill plan may be ranked based on their value to the drill plan, and this ranking may be used to indicate which holes of the drill plan should be drilled first.

In another embodiment of any of the method or methods described above, the method may further comprise:
  using implicit modeling to model geological structures, contacts, faults, shells, surfaces, or a combination thereof, of the one or more target volumes; and
  improving the model based on data acquired from carrying out the drill plan.

In yet another embodiment, there is provided herein a computer system for improving mineral resource exploration and resource classification efficiency by generation and improvement of a drill plan, said computer system comprising:
  a memory for storing program instructions; and
  a processor for executing the program instructions;
  wherein the program instructions comprise instructions for:
    defining one or more target volumes of interest in 3D space;
    segmenting the one or more target volumes into sub-volumes to which one or more attributes indicating relative desirability may be assigned; and
    using an algorithmic solver to iteratively or programmatically generate and improve a drill plan which aims to provide an optimal or near optimal solution for drill hole distribution within the one or more target volumes such that all or nearly all the sub-volumes, or at least the sub-volumes of greatest desirability, of the one or more target volumes are sampled to a specified or desired level;
  wherein the resulting drill plan comprises a collection of one or more planned drill holes which are defined in 3D space, and
  wherein a set of operational constraints constrains the iteratively or programmatically generated and improved drill plan; and
  wherein the computer system comprises an interface for input of user-defined target volume of interest parameters, operational constraint parameters, or a combination thereof.

In a further embodiment of a computer system as described above, the program instructions may comprise instructions for carrying out any of method or methods as described above.

DETAILED DESCRIPTION

Figure 1:
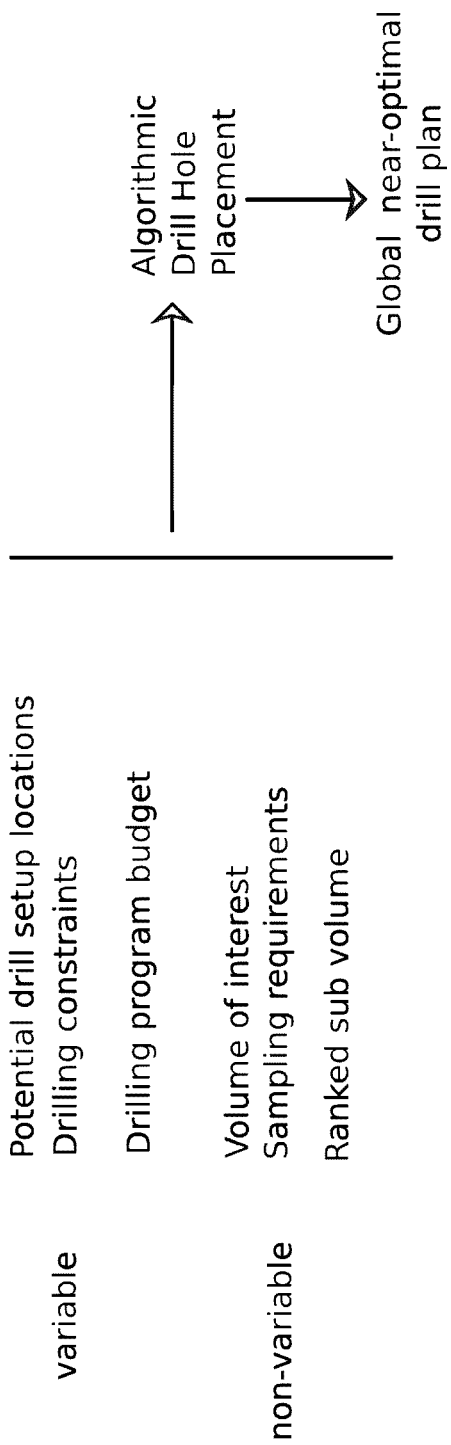
FIG. 1 shows a simplified example of a non-limiting embodiment of a method for improving mineral resource exploration and resource estimation or classification efficiency. In this example, 6 operational constraints are considered, three of which have been designated as variable, and 3 of which have been designated as non-variable.

Described herein are methods and systems for improving natural resource exploration and classification. It will be appreciated that embodiments and examples herein are provided for illustrative purposes intended for those skilled in the art, and are not meant to be limiting in any way, regardless of whether or not they are specifically designated as non-limiting.

In an embodiment, there is provided herein a method for improving mineral resource exploration and resource classification efficiency, said method comprising:

defining one or more target volumes of interest in 3D space;

segmenting the one or more target volumes into sub-volumes to which one or more attributes indicating relative desirability may be assigned; and using an algorithmic solver to iteratively or programmatically generate and improve a drill plan which aims to provide an optimal or near optimal solution for drill hole distribution within the one or more target volumes such that all or nearly all of the sub-volumes, or at least the sub-volumes of greatest desirability, of the one or more target volumes are sampled to a specified or desired level;

wherein the resulting drill plan comprises a collection of one or more planned drill holes which are defined in 3D space; and wherein a set of operational constraints constrains the iteratively or programmatically generated and improved drill plan.

As will be understood, a target volume of interest may be any suitable geological volume of earth to be investigated. The target volume of interest may contain, or be suspected of containing, one or more natural resources, or one or more geological structures or features of interest, or any combination thereof. By way of non-limiting example, a target volume of interest may be a volume of the earth located at, or adjacent to, a proposed or existing underground mining site.

It will be recognized that the target volume may be segmented or divided into sub-volumes. These sub-volumes may be the same as, or similar to, one another in terms of size and shape, or they may vary. Sub-volumes may be, for example, in the form of single or groups of blocks, polygons, or other suitable shapes. In certain non-limiting embodiments, the sub-volumes may form a block model, which may provide a geometric support for storing information, or attributes such as is described in further detail below, and my facilitate estimating the geological volume and associated features.

Attributes indicating relative desirability may be assigned or associated with individual sub-volumes or groups of sub-volumes. These attributes may include, by way of non-limiting example, one or more of distance of the sub-volume from an existing or planned drill hole; estimate variance; grade estimates; mining development or production schedules and timing; bounding of the sub-volume by site-specific geological structures or contacts such as, but not limited to, faults, estimated grade, rock type, etc.; and/or variability or uncertainty of grade estimation or interpolation of the sub-volume (i.e. a Kriging-type variability or uncertainty value in examples where a Kriging method or a conditional simulation or other appropriate estimation method is used to estimate or interpolate spread of observed or measured values from samples and observations to the target volume). By way of illustrative example, a sub-volume such as a block within the target volume which is not easily accessible and suspected of containing a natural resource, but has a large distance from the nearest existing and planned drill holes, and a large variability associated with its grade estimation, may be considered a desirable sub-volume based on its assigned attributes. By way of another illustrative example, a sub-volume within the target volume which is adjacent or intersecting with a geological structure of interest may be considered a desirable sub-volume based on its assigned attributes, as sampling of this sub-volume may provide more information regarding the geological structure. In certain examples, one or more of the assigned attributes may be used to determine a desirability value, or gain, of the sub-volume. Sub-volumes having the best desirability value, or gain, may be considered as desirable targets for exploratory drill hole investigation.

In certain embodiments, the method may further include the use of one or more constraints which limit or constrain the algorithmic solver and/or the resulting drill plan(s) to those meeting certain requirements or limitations. By way of example, constraints may include any of a variety of suitable operational constraints. By way of example, suitable operational constraints may include at least one of a historical drill hole locations constraint, a potential drilling setup location constraint, a drilling direction constraint, a drilling dips constraint, a drilling azimuth constraint, a drilling budget constraint, a sampling requirement constraint, a drilling setup availability constraint, a constraint regarding the total amount of surface ground disturbance, a topographical constraint, an environmental constraint, a constraint regarding environmental exclusion zones, a geological fault constraint, a geological contacts constraint, a geological structure constraint, or a constraint regarding existing underground workings or operations, or any combination thereof. By way of example, the method may include use of operational constraints comprising a potential drilling setup location constraint, a drilling dip constraint, and a drilling azimuth constraint to limit or constrain the algorithmic solver and/or the resulting drill plan(s). Operational constraints for a particular drilling site may include constraints on the allowable drilling starting points (collars), and/or the upper, lower, and outer perimeter drilling limits. Geological operational constraints may include examples such as a geological fault constraint, a geological contacts constraint, or a geological structure constraint. In certain embodiments, the operational constraints may include a drilling location constraint which restricts the algorithmic solver to only drill plans having drill holes located at a specified set of positions at the one or more target volumes. In an embodiment, the operational constraints may include one or more environmental constraints such as a constraint regarding the total amount of surface ground disturbance; such an operational constraint may be desirable in examples where environmental licensing limits where and how much ground may be disturbed. In a further embodiment, the operational constraints may include: topographical constraints which account for, for example, steep mountain sides or other such features; constraints regarding environmental exclusion zones; and/or constraints regarding existing underground workings or operations. In certain embodiments, the operational constraints may include a constraint based on the angle with which the proposed drill holes intersect any of the geological structures and/or contacts.

By way of non-limiting example, examples of constraints may include a specification of allowable drill hole start positions, such as start positions which are easily accessible or at which a drill rig is already located or nearby. In such a non-limiting example, which is provided for illustrative purposes to the person of skill in the art, the resulting drill plan may provide 3 dimensional specifications of one or more drill holes to be drilled from each of the specified start positions which provide an optimized sampling of the target volume within the specified constraints.

The person of skill in the art will be aware of algorithm types generally applicable as algorithmic solvers for solving problems (i.e. generating drill plans) such as those problems described herein. By way of non-limiting example, the algorithmic solver may be a linear algorithm, a heuristic algorithm, a metaheuristic algorithm, a metaheuristic SCP algorithm, a localized random search; a modified random search; a taboo search; or an annealing algorithm. Examples of suitable algorithmic solver types may be those described in, for example, *Metaheuristiques hybrids pour les problemes de recouvrement et recouvrement partiel d'ensembles appliqués au problem de positionnement des trous de forage dans les mines* (Nehme Bilal, Thesis, Ecole Polytechnique, Montreal, Canada, 2014; ISBN 9781321840629, 1321840624), which is herein incorporated by reference in its entirety. The person of skill in the art having regard to the teachings herein will recognize that a variety of different algorithms may be possible, such as for example a simulated annealing-based algorithm (see, for example, Soltani-Mohammadi and Hezarkhani, *Natural Resources Research*, Vol. 22(3), pages 229-237, 2013, which is herein incorporated by reference in its entirety). In a further non-limiting embodiment, the algorithm may be a linear method such as that of the CPLEX optimization software package, for example.

In certain embodiments, a metaheuristic algorithm such as that described in *Metaheuristiques hybrids pour les problemes de recouvrement et recouvrement partiel d'ensembles appliqués au problem de positionnement des trous de forage dans les mines* (Nehme Bilal, Thesis, Ecole Polytechnique, Montreal, Canada, 2014; ISBN 9781321840629, 1321840624) may be used in an algorithmic solver. Such an algorithmic solver may comprise a metaheuristic algorithm comprising a genetic algorithm component, an iterated local search algorithm, and a tabu search algorithm, for example.

In an embodiment the algorithmic solver may involve an iterative or programmatic algorithmic approach which attempts to solve the problem of drill hole number and placement at the target site (i.e. attempts to generate and improve a drill plan which aims to provide an optimal or near optimal solution for drill hole distribution within the one or more target volumes such that all or nearly all the sub-volumes, or at least the sub-volumes of greatest desirability, of the one or more target volumes are sampled to a specified or desired level). In certain embodiments, the algorithmic solver may attempt to solve surface-based layout problems, underground-based layout problems, or both. A drill plan may be a plan which outlines a proposed or predicted collection of drill holes to be used for sampling or investigating the target site. The drill plan may define the drill holes of the plan in terms of their 3D position in any suitable manner. The drill plan may provide 3-dimensional characteristics of each drill hole such that each drill hole can be understood, and drilled, by those of skill in the art. The drill plan may, for example, provide the start position of each drill hole, the depth of each drill hole, and the path the drill hole is to follow, or may follow, from the start position through or into the target volume. Characteristics such as collar location, dip, azimuth, and/or drill hole length may be provided as desired or needed. In an embodiment, the drill plan may also use a projected (or estimated) description of drill hole deviation to determine the expected (although non-prescriptive) path that the drill hole may follow when drilled. In another embodiment, the drill plan may include parameters relating to variability tolerances of the drill holes in the drill plan.

The algorithmic solver aims to generate and improve a solution, in the form of a drill plan, which provides an optimal or near optimal solution for drill hole distribution within the one or more target volumes such that all or nearly all the sub-volumes, or at least the sub-volumes of greatest desirability, of the one or more target volumes are sampled to a specified or desired level. It will be understood that generation and optimization or improvement of the drill plan may be an iterative, dynamic process. As additional information is acquired about the target volume as a result of exploratory activities such as drilling one or more planned drill holes from a previously or currently generated drill plan, the drill plan can be updated. For example, the one or more attributes assigned to the sub-volumes of the target volume can be updated as additional information is obtained, which may alter the drill plan solution produced by the algorithmic solver such that the new drill plan provides a more optimal solution which takes into account the newest available information and may, for example, provide an improved global distribution of drill holes within the drill plan. By way of example, the drill plan may be iteratively improved by improving the global distribution of drill holes within the drill plan based on newly acquired information as drill operations progress, based on new information obtained on-site (such as, for example, collar location limitations, etc. . . . ), or any combination thereof.

In certain embodiments, one or more planned drill holes from a previously generated drill plan may be drill holes which have been drilled quickly but with reduced regard for precision for geological-type drilling or bounding of the one or more target volumes. Accuracy generally decreases with speed. The information acquired from these one or more quickly drilled drill holes may be used to improve the drill plan with less invested time, and may allow for in-fill planning. Quickly drilled initial holes may have lower precision of targeting, however these drill holes may provide information about boundaries containing mineralization, for example. In-fill drilling would then allow drilling of the remaining budget (for example, two-thirds if one third was quickly drilled) to increase overall classification and conversion. Such an approach may employ single drill hole adaptability and local optimization within a drill plan as described herein, as well as a means for adapting the location of subsequent drill holes given initial drill hole locations that were drilled quickly, as also described herein.

It will be understood that the iterative and dynamic nature of methods as described herein may in an embodiment allow for the orientation of a drill hole of the drill plan to be recalculated in real-time to accommodate for on-site drilling limitations which may be encountered. Such on-site drilling limitations may include drill site accessibility, drill hole geometry limitations, drill site timing limitations, a requirement for movement of a drill rig, setup availability, environmental limitations, availability, performance limitations of the drill, drill availability, or any combination thereof.

In certain embodiments of the methods and systems described herein, it will be understood that a user may input, contribute, modify, or remove one or more drill holes to or from the drill plan which is generated/improved by the algorithmic solver. Such method and system embodiments may be considered as combined manual/automated methods and systems. In certain embodiments, the user may be provided with interactive feedback on the one or more contributed, modified, or removed drill holes with respect to their desirability, or with respect to the desirability of the resultant generated/improved drill plan which includes the one or more user-contributed, modified, or removed drill holes.

In certain embodiments, operational constraints may involve timing considerations. For example, changing collar location may affect the time taken to execute a program. If drill rigs do not need to be moved as often and/or the collar setup is quicker or potentially eliminated, then there may be a net gain in the time taken to drill a drill plan.

It will be additionally understood by the person of skill in the art having regard to the teachings herein that Measurement While Drilling (MWD) technologies may optionally be used or considered as part of the methods described herein. In certain embodiments, information obtained from measurement while drilling apparatus may be used when generating or improving the drill plan. Measurement-while-drilling apparatus may be employed as a further means for collecting information to be supplied to the algorithmic solver for iteratively generating an improved drill plan. By way of non-limiting example, measurement while drilling apparatus may be used to obtain data from the drill rig which may be used to facilitate or improve interpretation of geological contacts or rock types in the target volume. Examples of MWD apparatus are described in, for example, Canadian patent application no. 2,787,851, which is herein incorporated by reference in its entirety. MWD technology allowing determining of rock characterization at the drilling face as will be known to the person of skill in the art may be suitable for such applications.

In certain embodiments, the drill plan may aim to sample sub-volumes of the target volume(s) such that the highest aggregate desirability is achieved. Using such an approach may result in a drill plan which favors drill holes which primarily sample or investigate sub-volumes having a high desirability as determined by their associated attributes. In certain non-limiting embodiments, the attributes assigned to the sub-volumes which are sampled by a given drill hole may be used to determine a desirability value of the drill hole. Drill plans may, in certain non-limiting embodiments, aim to provide a collection of drill holes in which each drill hole has a maximized or near maximized desirability value, or may aim to provide a collection of drill holes having an overall, average, or aggregate desirability value determined from the desirability values of the individual drill holes which has a maximized or near maximized value. By way of non-limiting example, the aggregate desirability may primarily consider the value of resource classification, the decrease in estimation uncertainty, the identification of geological features or structures bounding the one or more target volumes, or a combination thereof.

In certain further embodiments, the algorithmic solver and/or resulting drill plan may be constrained by a budget constraint such that only drill plans meeting a specified budget constraint will be allowed or produced. A budget constraint may include, for example, one or more of constraints which limit the allowable total drill hole length of the drill plan, the drill hole length of individual drill holes, the total number of setup locations, the total time or predicted time to drill the plan, the location or position of drill holes, the collar locations, and/or may limit drill holes to positions which are more easily accessible, for example. A budget constraint may limit, for example, aggregate drill hole length of the drill plan. In an embodiment, the algorithmic solver may aim to generate a drill plan which attempts to maximize the number of sub-volumes sampled or classified by the drill holes of the drill plan while minimizing the total planned drill length of the drill plan, or while attempting to maximize the number of sub-volumes sampled or classified per unit of planned drill length (i.e., per meter, or per foot).

In natural resource exploration, target volumes are often discussed in terms of value, or reportable value. The person of skill in the art will be aware of suitable criteria which may be used to classify sub-volumes or a target volume, or a target volume itself. By way of non-limiting example, NI-43-101 specifies standards of disclosure for mineral projects in Canada, JORC in Australia. A qualified person generally provides classification criteria used to calculate/classify a resource.

In an embodiment of a method as described herein, the iteratively or programmatically generated and improved drill plan(s) may be scored by a resource conversion calculator, and the algorithmic solver may improve the drill plan score using one or more parameters (such as, for example, operational constraints as described above, the specified or desired level as described herein, or a combination thereof) which are changed or flexed using a constraint modifier between iterations. In certain embodiments, scoring of the drill plan(s) may include rewarding drill plans which provide information about the location of geological structures and contacts of the one or more target volumes, or rewarding drill plans which have a reasonable probability of success, or both.

Exploratory sampling of a target volume enables classification of sub-volumes of the target volume. A method as described herein may provide a drill plan which aims to provide an optimal or near optimal solution for drill hole distribution within the one or more target volumes such that all or nearly all the sub-volumes, or at least the sub-volumes of greatest desirability, of the one or more target volumes are sampled to a specified or desired level. This specified or desired level may be related to resource/sub-volume/target volume classification. Such classification is typically based on the extent to which the sub-volume has been sampled by the drill holes of the exploratory sampling. By way of non-limiting example, sub-volumes may be classified or ranked, in order of increasing confidence, as unclassified, geological, inferred, indicated, or measured resource (see, for example, *Prospecting and Exploration of Mineral Deposits*, Bohmer and Kucera, Elsevier, Developments in Economic Geology (21), $2^{nd}$ Ed., 1986, which is herein incorporated by reference in its entirety). In an embodiment, the specified or desired level may be selected from a range spanning geological, inferred, indicated, measured resource, and probable or proven reserve. By way of non-limiting example, the specified or desired level may be at least about 60% (or at least about another desired % value suitable for the particular application) of the target volume should be converted to indicated while minimizing measured.

It will be understood that mineral resource upgrading may refer to the additional sampling (in most cases, drilling) that is performed to create sufficient confidence to all the shape, extents, continuity, and grade of a volume of ground to be estimated. Deposit upgrading may refer to industry accepted, and in some jurisdictions mandated, definitions related to the quality of estimation for a geological volume of ground.

As the density of sampling increases, the risk associated to the estimation of a deposit's shape, location, continuity, and mineral content decreases. A sampling criteria suitable for categorizing a volume of ground from geological, to inferred resource, indicated resource, and measured resource, may be proposed. Additional engineering evaluation and sampling may then allow for a resource volume to be moved into probable and proven reserve categories.

Although measured classification is among the highest level of confidence, it should be noted here that in certain non-limiting examples converting too much of a target volume to measured classification may be seen as overdrilling or oversampling for the current stage of exploration; in such examples, a certain volume of the target being classified at a lower level such as indicated or inferred may be sufficient.

In yet another embodiment, the resulting drill plan may provide a ranking or scoring for each planned drill hole which is based on the relative value of each planned drill hole to the overall drill plan. The overall value may be based on, for example, the aggregate relative desirability of the sub-volumes sampled by the drill hole. In certain embodiments, one or more of the lowest ranked drill holes may be eliminated from the drill plan to improve the overall efficiency of the plan.

In still another embodiment, a ranking or scoring of the drill plan may include a penalty for moving or repositioning a drill hole of the drill plan away from a position at the one or more target volumes which is easily drilled, or away from a position at the one or more target volumes at which drilling equipment is already located. As well, or alternatively, ranking or scoring of the resulting drill plan(s) may include rewarding drill plans which provide information about the location of a geological contact or structure which is between different deposit types or two rock types in the target volume, or rewarding drill plans which have a reasonable probability of success (which may be related to, for example, the probability a drill hole can be completed). As well, or alternatively, scoring of the drill plans may include a reward for drill plans which allow for conversion of the identified high-value sub-volumes from unclassified to inferred, indicated, or measured, optionally using a minimized aggregate drill hole length or minimized number of drill holes. In a further embodiment, the value to the drill plan of changing one or more drill hole collar locations while dynamically updating dip and dip direction may be assessed.

In certain embodiments of a method as described herein, a completion constraint may be used to identify a point at which sufficient drilling has been completed. It will be understood by the person of skill in the art that after a sufficient amount of sampling has been completed, further sampling may provide diminishing returns in terms of the value and breadth of additional information acquired compared to the cost associated with acquiring that information. Thus, in certain embodiments, a constraint may be set to flag the point at which further drilling may not be considered being worthwhile. The point at which sufficient drilling has been completed may be a point at which further increase in drill hole density may provide additional value which is below a specified threshold (i.e. may not be worthwhile)(i.e. by way of non-limiting example, about 60% of target volume to indicated classification).

In still another embodiment of a method as described herein, the method may further comprise:
using implicit modeling to model geological structures, contacts, faults, shells, surfaces, or a combination thereof, of the one or more target volumes; and
updating the implicit modeling as drill hole data is acquired,
thereby dynamically identifying high-value sub-volumes to be converted from unclassified to geological, inferred, indicated, or measured.

In still another embodiment of a method as described herein, the method may further comprise:
using implicit modeling to model geological structures, contacts, faults, shells, surfaces, or a combination thereof, of the one or more target volumes; and
improving the model based on data acquired from carrying out the drill plan.

In still another embodiment, drill holes of the drill plan may be targeted to improve the implicitly modeled surfaces.

Examples suitable for implicit modeling may include GoCAD, MAPTEK, LEAPFROG for implicitly producing surfaces.

Suitable methods and techniques for implicit modeling will be known to the person of skill in the art having regard to the teachings herein. Generally, implicit modelling may be used to create 3D models including surface shells which represent volumes which are being investigated by drilling. Grade contours, lithological contacts, potential fault interpretations, and/or other features may be represented. Implicitly modeled surfaces may, for example, be updated as new drilling occurs, allowing updating of volumes which are to be drilled at a given density to provide sufficient sample information to achieve resource classification criteria.

It will be understood that in certain embodiments, the drill plan may be recalculated, and the scoring of the resulting drill plan may include a reward for solutions which allow for conversion of the identified high-value sub-volumes from unidentified unclassified to inferred, indicated or measured. The drill plan may attempt, for example, to minimize the total length of drill holes that are used for conversion of the one or more target volumes from unclassified to indicated, inferred, or measured. The drill plan may change setup locations.

In certain embodiments, modelling, algorithmic solvers, and/or drill plans as described herein may attempt to account for drill hole deviations which may occur, such as a change in loft, or a change in curl. Suitable methods for predicting drill hole deviations will be known to the person of skill in the art having regard to the teachings herein.

It will be understood by the person of skill in the art having regard to the teachings herein that methods described herein may allow for iterative recalculations to generate and improve resulting drill plans. In certain non-limiting embodiments, the orientation/position of a given drill hole with respect to the target can be updated or recalculated in real-time at the drill site, allowing real-world limitations or conditions to be accounted or adjusted for in the drill plan as exploratory drilling proceeds. Such embodiments may, in certain examples, reduce the amount of time invested in precisely placing the drill and precisely drilling drill holes to match rigid drill plans generated manually off-site, as has been conventionally done in the field.

In another embodiment, a non-limiting example of a method for improving mineral resource exploration and resource classification efficiency as described herein may comprise:
- modelling the problem of drill holes number and placement at a target volume as a Set Covering Problem (SCP); and
- solving the SCP using an algorithmic solver, and scoring the resulting solutions to the SCP, thereby identifying a solution to the SCP which optimizes the distribution of the drill holes at the target volume;
- wherein the solution to the SCP attempts to maximize the volume of the target volume which can be converted from unclassified to inferred, indicated or measured classification while remaining within a set of operational constraints.

The person of skill in the art will recognize that the SCP, and the algorithmic solver, may be or comprise an SCP and a metaheurisitic algorithm such as that described in *Metaheuristiques hybrids pour les problemes de recouvrement et recouvrement partiel d'ensembles appliqués au problem de positionnement des trous de forage dans les mines* (Nehme Bilal, Thesis, Ecole Polytechnique, Montreal, Canada, 2014; ISBN 9781321840629, 1321840624).

In a further embodiment, such a method may use an iterative process to determine drill hole spacing and coverage parameters for the modelled SCP. The person of skill in the art will further recognize that solutions to the SCP may be in the form of a drill plan, which outlines a proposed or predicted collection of drill holes to be used for sampling or investigating the exploration site as described above. In certain embodiments, the solution to the SCP (i.e. the drill plan) may provide a ranking for each planned drill hole of the solution, which is based on the relative value of each planned drill hole to the overall solution. One or more of the lowest ranked, or lowest relative valued, drill holes may, optionally, be eliminated from the solution to the SCP as desired.

It will be understood to the person of skill in the art having regard to the teachings herein that the set of operational constraints may comprise any of a variety of suitable operational constraints such as those described above.

In certain embodiments, the modelled SCP of the method may divide the exploration site into blocks or sub-volumes within a target volume, and the solution to the SCP may attempt to maximize or improve the number of blocks or sub-volumes sampled by a collection of drill holes while also minimizing, reducing, or capping the total number of drill holes and/or the total drill hole length in the collection. In certain additional embodiments, the modelled SCP may, for example, divide the exploration site into blocks or other sub-volumes within a target volume, and the solution to the SCP, such as a drill plan as described above, may attempt to maximize the volume of the exploration site which can be converted to a specified classification which is selected from a range spanning inferred, indicated, or measured resource, probable or proven reserve. In certain examples of a method as described herein, scoring or ranking of the resulting solutions to the SCP (i.e. scoring of drill plan solutions) may be performed as described above.

It will be understood by the person of skill in the art having regard to the teachings herein that the methods as described herein may be iterative methods which may be repeated by re-modelling the problem of drill holes number and placement based on newly acquired information about the exploration site obtained from drilling and sampling a hole. In certain embodiments, the orientation of a drill hole of the solution to the SCP may be recalculated in real-time to accommodate for on-site drilling limitations such as those described above.

It will be understood by the person of skill in the art having regard to the teachings herein that methods as described herein may, in certain non-limiting embodiments, include consideration of factors, components, constraints, and/or parameters including, but not limited to, any one or more of the following:

Resource Sensitivity: Given a resource classification criteria, it may be determined how conversion is affected by flexing constraints in the geological targeting model. Given the geometric complexity of most drilling programs, a large number of constraints may be modified without changing the spacing requirement. The drill hole spacing requirement may be geo statistically determined, and changing its value may inherently change the value of the sampling program.

Classification/Deviation Sensitivity: The use of drill hole deviation models may provide an estimate of the change of drill hole direction; it is presumed, however, that the actual drill hole pierce point in a target will diverge from the estimated location. This difference between the plan and the actual pierce point may affect the overall expected classification. With a Monte Carlo type simulation in conjunction with a resource conversion calculator, it may be possible to determine a confidence interval on the expected classification conversion given an expected overall drilling accuracy estimate.

Drill hole Spacing (in 2D or 3D): Resource conversion may be defined by the amount of sampling required to reduce geo-statistical uncertainty below a defined threshold. Geometrical complexity often makes it difficult to space drill holes correctly or optimally on a regular grid. A typical simplification may be to define a spacing of holes, often represented as a grid spacing in 2D. This grid is then projected into 3D space. This nominal or targeted spacing defines the density of drilling that may be required to potentially move a volume of ground from one resource category to the next.

Budget: The total cost of the drilling campaign; depending on the location, this may include direct drilling costs or may include all costs associated to drilling the campaign and, in some cases, analysing the results.

Full drilling budgets: The full budget may be determined as the least amount of drilling required to classify the full target volume into the specified resource category. Because of decreasing returns, the full budget may rarely, if ever, be drilled. The full budget provides an upper budgetary limit for excellent conversion.

0-100 (full) % Drilling Budget: Determining the full budget required to transfer all of the target volume(s) of interest to target higher resource classification may create an upper budgetary boundary. Varying the budget from no drilling to the maximum budget highlights a number of dynamics related to the volume of interest and the classification scheme, which may allow decisions to be made based on quantified values.

Multiple Solutions/Drill Plans: The resource conversion dynamics are such that for relatively small budgets there may be a large number of equi-valuable or near equi-valuable solutions. An extreme example is the value that a single drillhole can produce—given a single hole there are a variety of locations where it can be drilled. When considered within a larger context, the single hole may have the same overall conversion but other metrics may make one hole better than another.

Planned Hole Ranking (i.e. assigning a relative rank or value to drill holes): Given a solution drill plan made up of a number of drill holes, the relative value produced by each of the drill holes, for either exploration or resource conversion, may not be identical. By providing a measure of value anticipated/produced by each of the drill holes, it may be possible to rank the order in which holes should be drilled. For a given setup location, in particular when under tight time constraints, the highest value holes may be drilled first (see, for example, FIG. 11).

Setup Locations: May define where drill rigs may be located to undertake drilling holes. In surface drilling, environmental constraints may limit where drills can be setup. Because underground environments generally involve excavated tunnels to position the drills, the cost of setups may be a significant budgetary allocation within the overall drilling budget.

Setup Timing/Availability: Setup locations may not always be available during the full duration of a drilling campaign. Maximizing when drilling can occur at a location, that is only available for a short period of time, may improve the overall effectiveness of a drilling program.

Drilling Setup Ranking: Each setup may be ranked by the value that it provides to the overall drilling campaign. When a number of setups are combined, it may be possible to calculate the relative value that setup placement may have on the overall program's efficiency.

Drilling Constraints: depending on the geometry of the setup location and on the type of drill rig being selected, the orientation of the drilling may be constrained. Including these constraints may allow that for each setup, planned holes may be effectively drilled. Typically, constraints are defined as the dip and azimuth ranges available from each drilling location.

Resource conversion efficiency: Resource conversion efficiency may provide an unambiguous means of comparing possible drill plans. Using metres drilled by meter cube converted ($m/m^3$) provides an objective means of gauging the effectiveness of drill programs.

Drill hole deviation modeling: Drilling and in-situ rock property variations may deflect the path of the drill string as drilling progresses. A deviation in both loft (upward inclination) and curl (spiraling) may be applied to predict the expected path for the drillholes. Analysis of historical drilling data may be used to guide the determination of the appropriate parameters to use to predict the deviation.

Target volume or Volume of interest (in 2D or 3D): The volume of interest or target volume may define a volume of ground that is to be sampled. The expectation is that sampling may be undertaken by drilling. The volume of interest need not be contiguous. Historically, the 3D volume of interest was segmented into a series of 2D planes with drilling being constrained within these planes.

Drill Hole Geometric Constraints: The drill setups and the selection of drill rig may determine physical limits that may be applied to each drill plan. Geometric constraints are often set by historical experience (i.e. underground fan drilling patterns—zero change in azimuth while varying dip—to determine true mineralization width).

Faults, Structures, Contacts: The geological domain under exploration may not be homogeneous and is often intersected by structures and changes in lithology, mineralogy and alteration (if it were homogeneous, there would be little value in additional exploration). Determining the location of these geological discontinuities and features (extension from existing volume), is a component of exploration, as these features typically constrain the location where mineralization is expected.

Drill hole to structure constraints (angle of incidence): may determine the limits associated to drilling through contacts or boundaries. This may include ensuring that geological targets are hit at specific angles in order to determine "true width", or to ensure that faults are hit at angles that decrease the chance that the drill hole will deviate along the structure.

No Drill Volumes (Exclusions): Volumes of ground where drill holes cannot be drilled. An example of this is where historical mining exists, and drilling into historical openings would jeopardize the drill hole.

Setup Exclusion Volumes: The location where drill rigs may be setup may be limited. On surface, this is often due to topographic or environmental exclusions. In the underground environment, opening geometries, production, travel traffic patterns, and the availability of services often limit the locations where drill rigs may be setup.

Classification criteria: Based on experience, and backed by geostatistical modeling of historical samples, the classification criteria may describe non-prescriptive criteria to determine when a sub-volume of ground can be moved to higher value classification. Inherent in the classification criteria is the concept that the classification is being performed within a certain confidence interval—increasing resource classification from inferred to measured reduces risk but does not eliminate it.

Classification Targets: Because it may be economically difficult to justify that 100% of volume of interest be upgraded to the higher resource classification category, it is common practice that a target percentage be defined. Thus, the target for a drill program may be to reach, for example, 80% conversion to the Indicated category.

Resource Classification Trade-Offs: While drilling to upgrade to the Indicated category, for example, it may be possible that some of the volume of interest be upgraded to Measured. This upgrading may be undesired in certain examples, and may be an indication of over-drilling. As part of the optimization, limiting the amount of ground that is "over converted" may be done to limit over-drilling. Alternatively, varying the percentage of ground converted between Inferred and Indicated may be an effective means of maximizing the value of a drilling program by both de-risking the ground (Indicated), and increased the projected size of the mineralized volume (Inferred).

Block properties: The volume of interest may be subdivided into a number of smaller sub-cells or sub-volumes. The cell volumes may be constant or variable volume within the volume of interest. Quantifiable properties, such as estimated grades, estimated variance, distance to nearest drillhole, samples within the search ellipsoid, etc . . . , may be allocated to each of the cells. Adding quantification to the sub-volumes within the volume of interest may be done by placing the values at the centroid of each of the sub-cells, for example.

Targeting Gains: determining drilling targeting priorities may be partially accomplished by adding a desirability index to each sub-cell within the volume of interest. A simple example of desirability may be, for example, the use of distance to an existing drill hole. More advanced criteria may integrate grade estimation.

Distance to existing drill holes: This criteria may be used as an initial targeting parameter, as it generally provides the highest level of gain for a limited budget.

Estimated Grade: As part of the resource estimation, the assayed mineral content samples taken from existing drill holes may be interpolated/extrapolated to the full volume of interest. These estimates may then be used to determine the overall mineral content within the volume of interest. The estimate may be associated to an estimate error, and an overall sample variance, which provides an indication to the quality of the estimate.

Geological Domains: Interpreted (soft) volumetric boundaries used to separate ground that share common lithology, grade continuity or alterations. The drilling requirements may be specific to each of the geological domains. The level of uncertainty on the domain's boundaries may decrease as drilling density increases.

Plan Execution: Once a plan has been approved, drill rigs and crews execute the work. The value of the program is generally gauged on how closely the actual hole collar is to the planned collar (typical requirement within 1 metre), how accurately the hole's initial dip and azimuth are executed, and in some cases how closely the hole tracks to the expected path. During the execution, drilling data and core may be collected and analysed to update the plan.

Mining development or production schedules and timing: Mining development or production schedules and/or other timing considerations may be included as part of the one or more attributes indicating relative desirability assigned to sub-volumes.

Local Drilling Constraints: Executing a plan is often times constrained by local limitations. By way of example, in the underground environment, the configuration of the drilling rig may not allow all expected dip and azimuths to be drilled correctly.

Local Optimization: Given the current local constraints, the driller may have the option of selecting an alternative drill plan and using a geological model such as that described herein to verify the value of the change. This may be as simple as removing a constraint that drillholes have to be collared within a meter of the planned collar location and then updating the dip/azimuth to hit/sample the expected target volume, for example.

It will be understood by the person of skill in the art that the methods as described herein are suitable for execution on a computer. Thus, in yet another embodiment, there is provided herein a computer system for improving mineral resource exploration and resource classification efficiency by generation and improvement of a drill plan, said computer system comprising:

a computer-readable memory for storing program instructions (i.e. computer executable instructions); and a processor for executing the program instructions;

wherein the program instructions comprise instructions for:

defining one or more target volumes of interest in 3D space;

segmenting the one or more target volumes into sub-volumes to which one or more attributes indicating relative desirability may be assigned; and using an algorithmic solver to iteratively or programmatically generate and improve a drill plan which aims to provide an optimal or near optimal solution for drill hole distribution within the one or more target volumes such that all or nearly all the sub-volumes, or at least the sub-volumes of greatest desirability, of the one or more target volumes are sampled to a specified or desired level;

wherein the resulting drill plan comprises a collection of one or more planned drill holes which are defined in 3D space, and wherein a set of operational constraints constrains the iteratively or programmatically generated and improved drill plan; and wherein the computer system comprises an interface for input of user-defined target volume of interest parameters, operational constraint parameters, or a combination thereof.

In a further embodiment of a computer system as described above, the program instructions may comprise instructions for carrying out any of method or methods as described above. The program instructions may cause a computer to perform steps of such methods when executed.

In an embodiment of a computer system as described herein, the computer-readable memory of the computer system may comprise any suitable non-transitory, tangible computer-readable media such as, but not limited to, CD, DVD, Blu-Ray, flash drive, hard drive, cloud drive, or remote storage media accessible via the internet or other communications channel. Computer-readable media may include, for example, any of volatile and non-volatile, removable and non-removable tangible media implemented in any method or technology for storage of information such as computer readable instructions, data structures, program modules, or other data. Computer-readable memory may include, but is not limited to, RAM, ROM, EPROM (eraseable programmable read only memory), EEPROM (electrically eraseable programmable read only memory), flash memory, or other memory technology, optical storage media, magnetic cassette, magnetic tape, magnetic disk storage, or other magnetic storage media, or other type of volatile and/or non-volatile memory, and any other suitable tangible medium which may be used to store the desired information and which can be accessed by a computer including and any suitable combination of the foregoing, as will be known to the person of skill in the art having regard to the teachings herein.

In certain embodiments, computer-readable data embodiment on one or more computer-readable media may define instructions, for example, as part of one or more programs, that, as a result of being executed by a computer, instruct the computer to perform one or more of the functions described herein. Such instructions may be written in any suitable programming language known to the person of skill in the art. The computer-readable media on which such instructions are embodied may, in certain embodiments, reside on one or more of the components of either a system or computer readable medium described herein, may be distributed across one or more of such components, and may be in transition therebetween.

The computer-readable media or memory may, in certain embodiments, be transportable such that the instructions stored thereon can be loaded into any suitable computer resource to implement the methods as described herein. In addition, it will be understood that the instructions stored on the computer-readable media described above are not limited to instructions embodied as part of an application program running on a host computer. Rather, the instructions may be embodied as any type of computer code (e.g. software or microcode) that may be employed to program a computer to implement aspects of the methods described herein. The computer executable instructions may be written in a suitable computer language or combination of several languages.

In certain embodiments, computer systems as described herein may include one computer, or multiple computers in communication via one or more computer networks, and may optionally include one or more servers, terminals, displays, user interfaces, and/or printers. In certain embodiments, one or more computers and/or user interfaces may communicate via, for example, a data telecommunications network, a local area network (LAN), a wide area network (WAN), internet, intranet, extranet, and may include local and/or distributed computer processing systems.

In certain embodiments, computer systems as described herein may include a suitable operating system as will be known to the person of skill in the art. In certain embodiments, computer systems described herein may include one or more displays for conveying information to a user, and one or more user interfaces through which the user may interact with the system.

It will be understood by the person of skill in the art that in certain embodiments the program instructions may be implemented in the form of software, firmware, or hardware. In certain embodiments, the program instructions may be implement in the form or an API (application programming interface), or in the form of a RESTful (representational state transfer) web service, for example. The program instructions may comprise instructions in the form of a programming language as will be known to the person of skill in the art, and may include a user interface allowing a user to enter parameters or selections concerning, for example but not limited to, operational constraint information, target volume information, specified or desired level information, relative desirability attribute information, algorithmic solver selection or customization information, constraint modifier information, resource conversion calculator information, drill plan information, drill plan scoring information, one or more drill holes to be included in the drill plan, or any combination thereof. The user interface may allow a user to review generated drill plans, adjust or flex parameters such as operational constraints, and trigger the generation of new drill plans. The user interface may also present the user with a generated or improved drill plan and relevant information contained therein. The drill plan may be presented to a user graphically, or in any other suitable form as desired. Drill plans may be transmitted to other users such as an on-site drilling team, who may also be allowed access to the user interface and/or computer system as described herein.

The person of skill in the art will also understand that the program instructions may be executed on one computer or on several computers. By way of example, the algorithmic solver may run on a server or remote computer having a more powerful processor in order to save time in examples where a user is accessing the system on a handheld device such as a phone or tablet.

Examples of certain non-limiting embodiments of methods and systems as described herein will now be described. It will be understood that these examples are provided for illustrative purposes to the person of skill in the art, and are not intended to be limiting in any way.

Example 1—Decision Criteria, Constraints, Methods, and Systems for Drill Plan Generation and Optimization A simplified example of a non-limiting embodiment of a method for improving mineral resource exploration and resource/reserve classification efficiency is shown in FIG. 1. In this example, 6 operational constraints are considered, three of which have been designated as variable, and 3 of which have been designated as non-variable. Non-variable constraints in this example are used to define limitations and parameters which are to be met by the drill plan, and variable constraints are parameters and limitations which can be modified, flexed, or altered during the generation and optimization of the drill plan. It will be understood that these variable and non-variable designations are non-limiting and may change as desired. In this example, non-variable constraints include the volume of interest (i.e. a contiguous or non-contiguous volume of ground to be sampled) and the sampling requirements (i.e. the density of drilling required to appropriately sample the volume). It will be understood that the volume of interest is not always completely defined, and part of a drilling campaign may focus on determining the more detailed location or bounds of the target volume. In certain examples, to simplify the problem space, the volume of interest may be represented as a series of 2D planes, or surfaces, within the volume of interest. There are no limitations to the orientation of the 2D planes or surfaces within the target volume, but they may be generally parallel planes.

Exploration and resource definition drilling is generally done in a series of steps where the volume of interest is sampled at incrementally increasing densities to reduce the mineral estimation risk. Early drilling may only be interested in whether mineralization is present or not. Subsequent drilling may be interested in determining the geometric boundaries of the mineralization. Next, mineral resource estimation drilling increases the drilling density to estimate the mineral content in the volume of interest. As such, it will be understood that over time, the target volume may change. Change does not always occur, however. For example, for a late stage program the targeted volume may be constant, and focus may be placed on decreasing risk by increasing the density of sampling.

Determining the sampling requirements such as sampling density may generally be done by a person skilled in the art. Decisions are typically based on:
professional knowledge;
experience from other similar properties; and
on data taken from initial drilling campaigns.

The sampling density may be given as, for example, a grid spacing (100×100 m), a distance to closest drillhole(s) (i.e. a hole within 80 m, 2 holes within 70 m), or any other suitable specification that describes the spatial characteristics desired within the volume of interest. Given sufficient sampling results, geostatisticians may use variography to determine the spatial and directional correlation for mineralization within the volume of interest. This may then result in the density of drilling changing depending on the orientation of the presumed mineralization within the target volume. In practice, different sub-volumes within the volume of interest may need to be drilled at different densities.

A sampling requirements constraint as described herein may account for these considerations.

A variogram may provide a skilled person with a means, based on actual samples, to refine the sampling spacing in such a way so as to statistically provide an assurance of mineral continuity along certain directions in space. The continuity may not be equal in all directions, and thus the use of an ellipsoid is often used to describe the sampling spacing.

In the illustrated example, an algorithmic drill hole placement tool (also referred to herein as an algorithmic solver) generates and iteratively improves a drill plan which is constrained by the specified operational constraints. The resulting drill plan is an optimal or near-optimal drill plan which meets the requirements of the operational constraints.

It will be understood that in certain examples, such as in early exploration or simple resource deposits, the algorithmic solver may attempt to homogenously sample the target volume and primarily consider factors such as sub-volume distance from a drill hole. In more complicated examples, such as cases where there is anisotropic distribution of mineralization, the algorithmic solver may change the distribution of drill holes to reflect the measured mineralization distribution.

Figure 2:
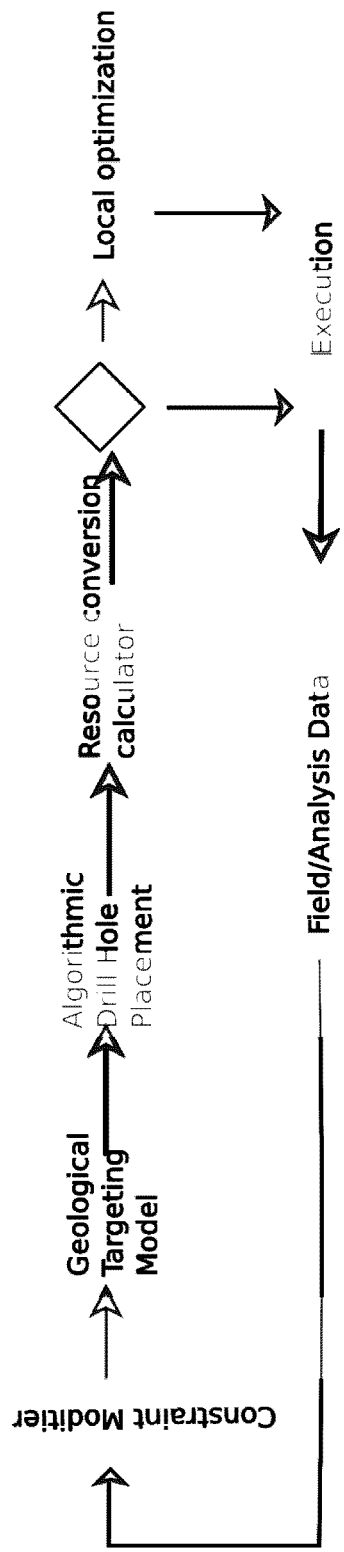
FIG. 2 shows another example of a non-limiting embodiment of a method as described herein. In the illustrated method embodiment, said method comprises a geological targeting model and an algorithmic drill hole placement component.

Another example of a non-limiting embodiment of a method as described herein is shown in FIG. 2. In the illustrated method embodiment, said method comprises a geological targeting model comprising:
 one or more target volumes of interest defined in 3D space; the one or more target volumes being segmented into sub-volumes to which one or more attributes indicating relative desirability are assigned; and
 a set of operational constraints.

The illustrated method further comprises an algorithmic drill hole placement component. This component comprises:
 an algorithmic solver used to iteratively or programmatically generate and improve a drill plan which aims to provide an optimal or near optimal solution for drill hole distribution within the one or more target volumes such that all or nearly all of the sub-volumes, or at least the sub-volumes of greatest desirability, of the one or more target volumes are sampled to a specified or desired level;
 wherein the resulting drill plan comprises a collection of one or more planned drill holes which are defined in 3D space; and
 wherein the set of operational constraints of the geological targeting model constrains the iteratively or programmatically generated and improved drill plan.

The illustrated method further comprises a resource conversion calculator which scores the value of the resulting drill plan(s) generated by the algorithmic drill hole placement component. Local optimization and execution may further occur in the illustrated method as shown.

In the illustrated method, the resulting drill plan may be reconsidered in light of new field data and analysis data as shown with an aim towards improving the drill plan. For example, newly acquired information obtained as drilling operations progress and/or obtained from on-site observations may be used to reconsider the resulting drill plan. The illustrated method shown in FIG. 2 further comprises a constraint modifier. The constraint modifier changes or flexes parameters and/or constraints used by the geological targeting model (i.e. parameters of the target volume, operational constraints, etc. . . . ), taking into consideration the newly acquired information. A subsequent iteration may then occur, resulting in an improved updated drill plan.

In the method illustrated in FIG. 2, the resulting drill plan provides:
 the location where each drill hole starts as a 3D point (i.e. collar location);
 the direction of drilling, defined as a vector in 3D which provides two angles (i.e. azimuth and dip);
 the expected length of each hole; and
 optionally, the expected drill path may be predicted.

In the illustrated example, the drill plan further includes a ranking for each of the drill holes so that priority can be given to their drilling.

The example illustrated in FIG. 2 includes operational constraints in the geological targeting model which limit particular drilling operation budgets. Typically, resource drilling programs do not drill the full volume to a given density due to budget limitations. In the method shown in FIG. 2, ranking of the relative values of the sub-volumes within the target volume of interest (i.e. assigning relative desirability to the sub-volumes) may be used to preferentially drill off the volume for a limited budget. As described, the operational constraints in FIG. 2 include a variable budget constraint, and a means of placing a "desirability" value on each sub-volume within the volume of interest. By directing the algorithmic drill hole placement component to maximize the value of the blocks sampled with a high level of desirability for a given budget, the method can determine a level of priority drilling for a given target budget to reach a projected classification.

It will be understood that in certain examples, determining sampling desirability may be dependent on the drilling phase, and on the details of the geological domain being drilled. By way of a simplified example, the distance from an existing drill hole can be used to rank each of the sub-volumes in the volume of interest. Using such a simplified ranking, the algorithmic drill hole placement component may then place new holes in sub-volumes that are far from existing sampled locations. Although distance to a drill hole may represent a useful factor for ranking drill hole placement, it typically does not consider trade-offs associated with setup costs and other factors affecting downstream value. Thus, more complex desirability determinations as also described herein and below are often of interest.

More complex desirability determinations may include other criteria such as:
 estimate variance and/or grade estimates on sub-volumes (these may provide, for example, other criteria to guide drilling for cases where budgets are limited);
 the determined location of geological features or structures such as contacts and/or faults (these may add value to the interpretation without directly affecting the quality of the resource estimate);
 probability of surfaces and geological features;
 geometric or topological relationship between geological features;
 proximity to geological features;
 or any combination thereof.

Examples of attributes indicating relative desirability which may be assigned to sub-volumes are also described in previous sections above.

Typically, efforts are made to determine the bounding volumes of the volume of interest. The bounding volume is often times determined at the boundary of two or more rock types. For example, one rock type may be barren, whereas the other contains mineralization. This type of drilling is referred to as geological drilling, as it focuses on determining the geological/geometric characteristics of the volume of interest. Samples are analysed to determine lithology, with less emphasis placed on the grade of the sample.

Another type of drilling is known as resource or classification drilling. In this case, it is the grade of mineralization that is contained in the sample that is of value. This grade may then be used to estimate the value of mineralization in a larger volume of ground. The density of sampling (and in many cases the estimated grade) may determine whether a volume of ground can be moved into one of three recognized resource classification categories. In order of increasing value, based on quality of the estimate, the categories are: Inferred, Indicated, and Measured.

In the illustrated example shown in FIG. 2, as drilling density increases it becomes possible to move sub-volumes between each of the three categories above. As international regulations (i.e. JORC and NI 43-101) place more value on ground classified as Indicated and Measured Vs. Inferred, there is motivation to move ground to Indicated quickly while, in early cases, not moving ground to measured classification. Because of complex geometry, and based on the phase of drilling, the sub-volume that is drilled to a density required by Measured may be limited when the drilling objective is Indicated drilling, thus avoiding over-drilling in certain cases. Determining this type of trade off may involve a resource classification calculator as shown in FIG. 2, which may be used to provide feedback to the algorithmic drill hole placement component.

As will be understood, the method illustrated in FIG. 2 may be an iterative, dynamic method which may be repeated multiple times to provide a range of drill plan options which may be sensitive to return for drilling investment.

The optional location optimization phase may adapt the global optimal or near optimal plan to local drilling constraints.

Figure 3:
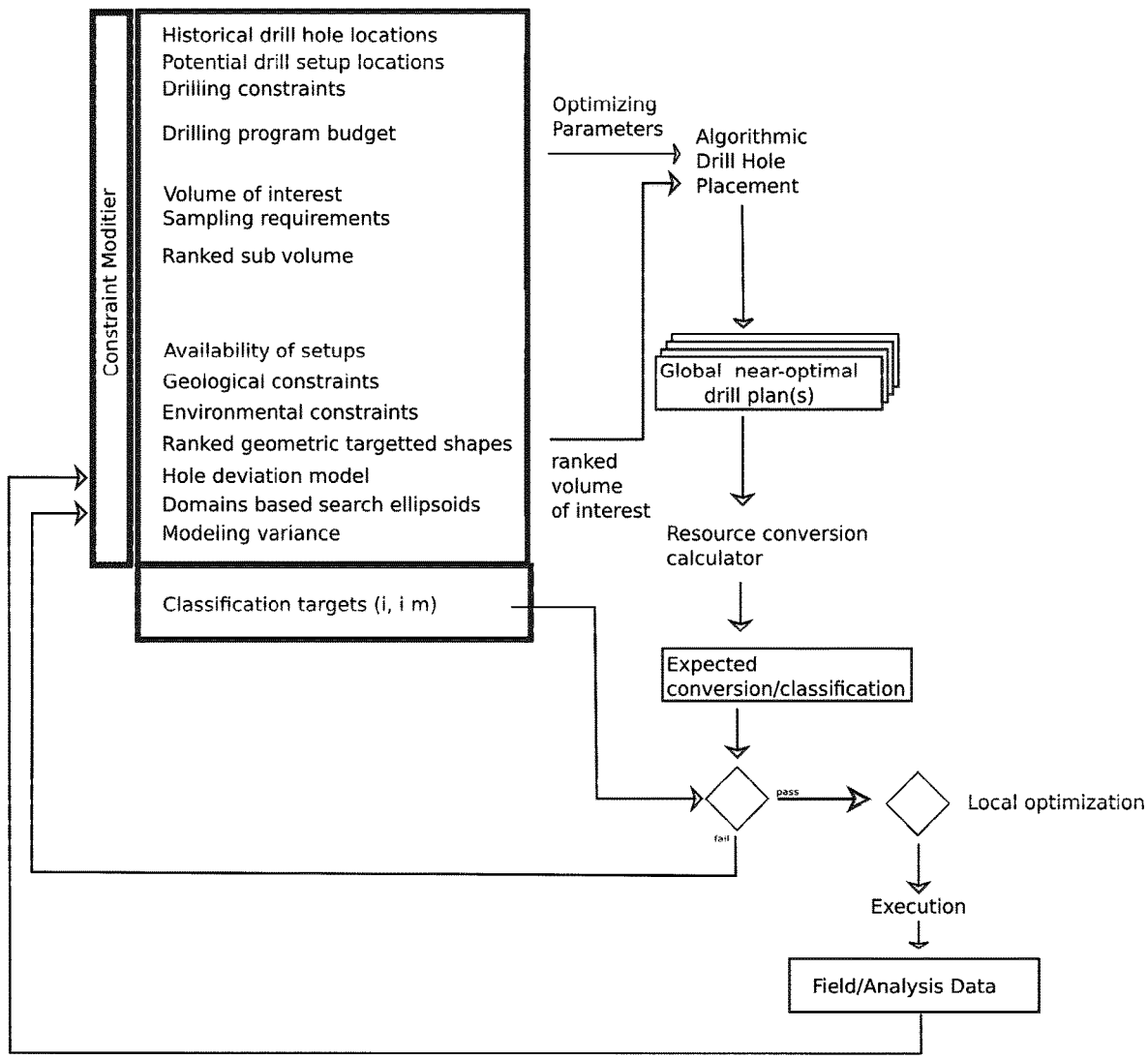
FIG. 3 shows another example of a non-limiting embodiment of a method as described herein. The illustrated embodiment is related to that shown in FIG. 2, and provides a more specific and detailed example for further illustrative purposes.

Another example of a non-limiting embodiment of a method as described herein is shown in FIG. 3. The illustrated embodiment is related to that shown in FIG. 2, and provides a more specific and detailed constraints examples for further illustrative purposes. In the illustrated embodiment, said method comprises a geological targeting model comprising:
  one or more target volumes of interest defined in 3D space; the one or more target volumes being segmented into sub-volumes to which one or more attributes indicating relative desirability (i.e. ranked volume of interest) are assigned; and
  a set of operational constraints (i.e. those shown in the large box at the top left of FIG. 3).

The illustrated method further comprises an algorithmic drill hole placement component. This component comprises:
  an algorithmic solver used to iteratively or programmatically generate and improve a drill plan which aims to provide an optimal or near optimal solution for drill hole distribution within the one or more target volumes such that all or nearly all of the sub-volumes, or at least the sub-volumes of greatest desirability, of the one or more target volumes are sampled to a specified or desired level;
  wherein the resulting drill plan comprises a collection of one or more planned drill holes which are defined in 3D space; and
  wherein the set of operational constraints of the geological targeting model constrains the iteratively or programmatically generated and improved drill plan.

The illustrated method further comprises a resource conversion calculator which scores the value of the resulting drill plan(s) generated by the algorithmic drill hole placement component, providing an expected conversion/classification. Local optimization and execution may further occur in the illustrated method as shown.

In the illustrated method, the resulting drill plan may be reconsidered in light of new field data and analysis data as shown, with an aim towards improving the drill plan. For example, newly acquired information obtained as drilling operations progress and/or obtained from on-site observations may be used to update the resulting drill plan. The illustrated method shown in FIG. 3 further comprises a constraint modifier which depicted in association with the set of operational constraints and the ranked volume of interest. The constraint modifier changes or flexes parameters and/or constraints used by the geological targeting model (i.e. parameters of the target volume, operational constraints, etc. . . . ), taking into consideration the newly acquired information (if available). A subsequent iteration may then occur, with improved parameters being used by the algorithmic drill hole placement component, resulting in an improved updated drill plan.

In the method illustrated in FIG. 3, the resulting drill plan provides:
  the location where each drill hole starts as a 3D point (i.e. collar location);
  the direction of drilling, defined as a vector in 3D which provides two angles (i.e. azimuth and dip);
  the expected length of each hole; and
  optionally, the expected drill path may be predicted.

The example illustrated in FIG. 3 includes several operational constraints (as shown in the large box at the top left of the Figure) in the geological targeting model. Operational constraints may include constraints which are time-dependent (such as, for example, when and where drilling setup locations are available). The operational constraints and target volume of interest parameters in the illustrated method may include: historical drill hole locations, potential drill setup locations, drilling constraints, drilling program budget, volume of interest, sampling requirements, ranked sub-volume, availability of setups, geological constraints, environmental constraints, ranked geometric targeted shapes, hole deviation model, domains based on search ellipsoids, and modeling variance, and combinations thereof.

The operational constraints allow for consideration of a wide variety of factors. As an example, geological constraints may be considered. For example, a constraint limiting the angle of intersection with identified or presumed geological structures may, in certain examples, allow for improving the overall efficiency of a drilling campaign. The angle of intersection with geological structures may ensure that drill holes actually drill through geological structures. By way of example, if the angle of incidence is too low, then the drill hole may deflect along the structure (undesired behavior), instead of drilling through the structure (desired behaviour).

In further examples, newly acquired drilling data may be used as a means to change or affect the volume of interest parameters, or other parameters or operational constraints being used by the algorithmic drill hole placement component. The target of interest may thus change if a user wishes to use a portion of the drilling budget to step-out from the existing known mineral envelope to expand the target volume.

Figure 4:
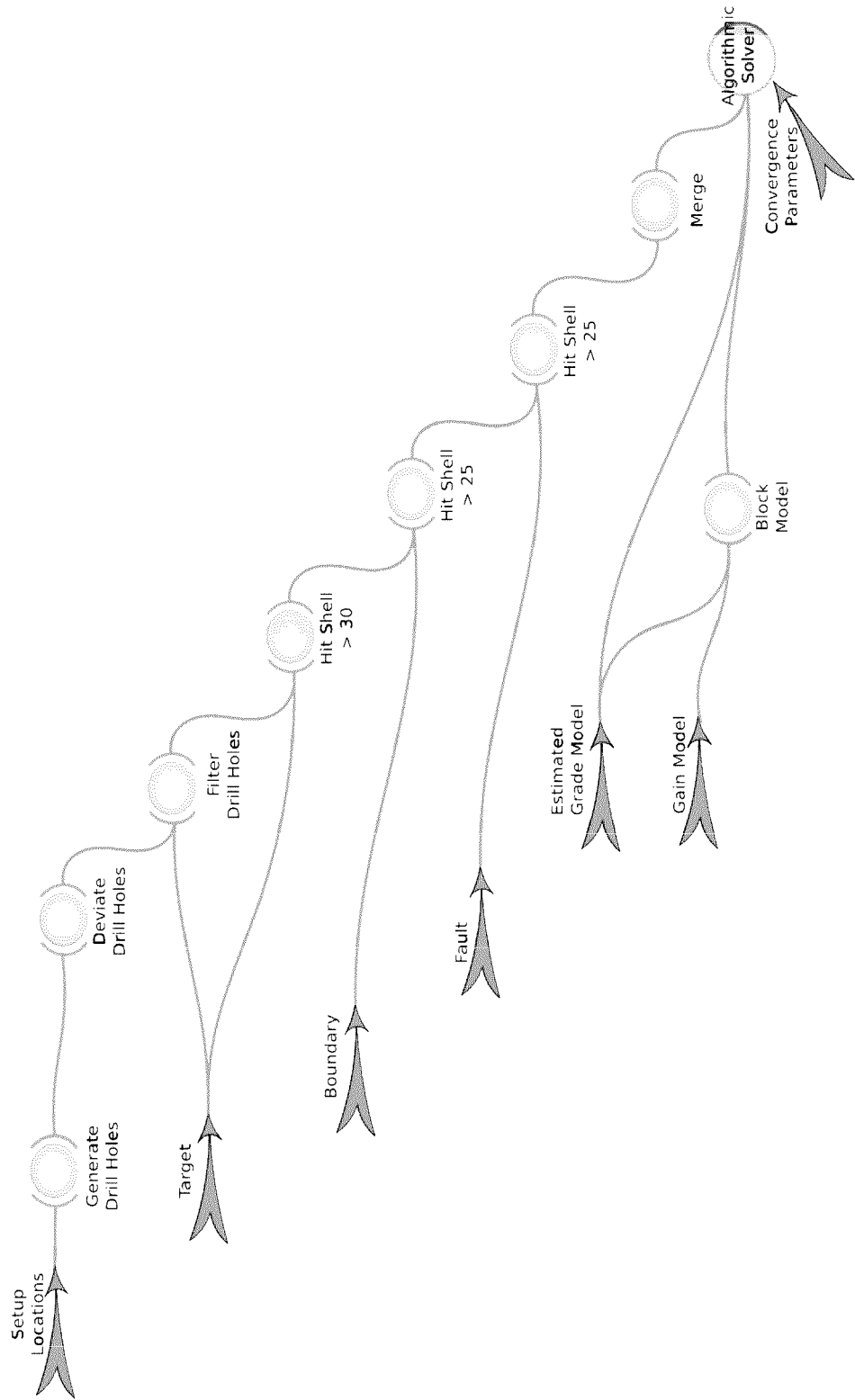
FIG. 4 shows a further detailed non-limiting example of data flow in the geological targeting model as shown in FIG. 3. This figure provides an illustration of data flow modeling geological decision making to provide data to the algorithmic drill hole placement component. The illustrated data model may be used to codify selected explicit and implicit factors in planning drill holes.

A more detailed example of data flow in the geological targeting model of FIG. 3 is shown in FIG. 4. This figure provides an illustration of data flow modeling geological decision making to provide data to the algorithmic drill hole placement component. The illustrated data model may be used to codify selected explicit and implicit factors in planning drill holes. The illustrated example is provided for illustrative purposes, and it will be understood that customization and tailoring may be performed in accordance with the problem being modelled. The order of data transformations may also change to reflect priorities for each drilling project. Depending on the case being modelled, not all input parameters may be present (for example, not all cases will have faults as part of the process).

The arrows in FIG. 4 represent external data provided to the system. This data may or may not be static. Typically, geometry and parameters evolve as drilling campaigns progress. Input data may be generated by a human, or may be calculated by an external process (i.e. implicit modeling of boundary surfaces based on drill hole intersects or geological interpretations). Having such a decision model may allow for each iteration to reflect the use of currently known data, and may allow for adaptability to changes in interpreted surfaces. By creating new projected surfaces (i.e. hypothesized surfaces), the model may further be used to determine "what-if" scenarios.

Data inputs shown in FIG. 4 may include the following:

Each circle represents a data processing step for either validating or transforming a dataset. By way of example, a drill hole loft transformation may calculate the expected trajectory of a drill hole based on a user supplied hole deviation expectation. This deviation expectation may be based on, for example, user experience when reviewing previous drilling campaigns. The exact model used to determine the expected trajectory for the drill holes may be customizable via scripting support.

The graphical representation in FIG. 4 does not explicitly show all of the data input parameters that may be defined for each of the transformation steps. As an example, the "Deviate Drill Holes" transformation may use an input of expected drill hole deviation—typically provided as angles over a distance drilled (curvature).

Figure 5:
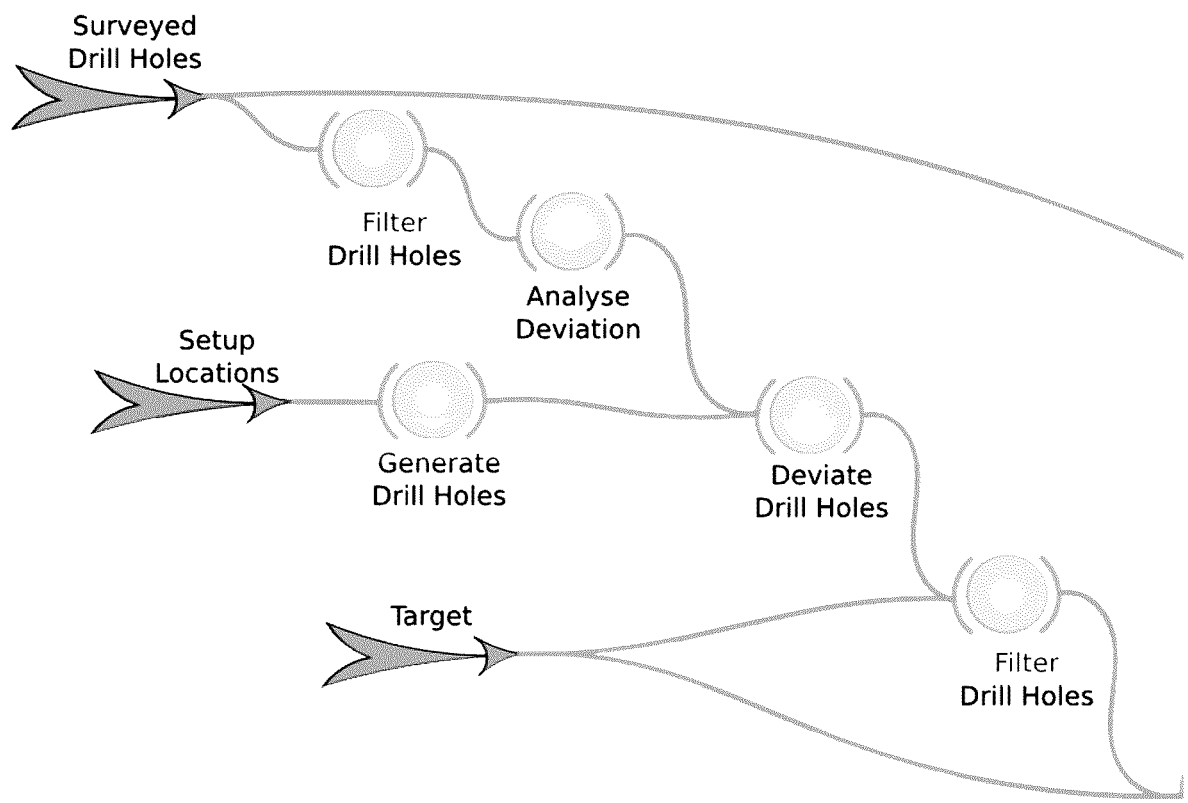
FIG. 5 shows an illustrative example of how transformation elements may be used to programmatically determine drill hole deviation parameters from existing Surveyed Drill Holes.

FIG. 5 depicts an illustrative example of how transformation elements may be used to programmatically determine drill hole deviation parameters from existing already drilled Surveyed Drill Holes. Additional filters may be applied to sample a subset of the historical drill holes to match parameters associated to new drill holes. Thus, drillhole deviation may be estimated not by manual input, but rather dynamically calculated based on historical drilling. As new holes are drilled, the estimated deviation may be refined for future holes. The addition of a Filter Drill Holes transformation may allow for only historical holes that are "like and in proximity" to the current holes being drilled to be used to create the deviation estimate.

The links shown in FIG. 5 represent the dataflow between data transformations (algorithms). Explicitly showing these links may allow users, such as users in the field, to quickly validate the model being used to determine the priorities associated to placing/distributing the drill holes within the target volume of interest. Each of the transformations may provide a level of selection or logic. When combined, the resulting dataflow may translate geological interpretation and decision making criteria into a data format that the drill hole placement algorithm may use.

Figure 6:
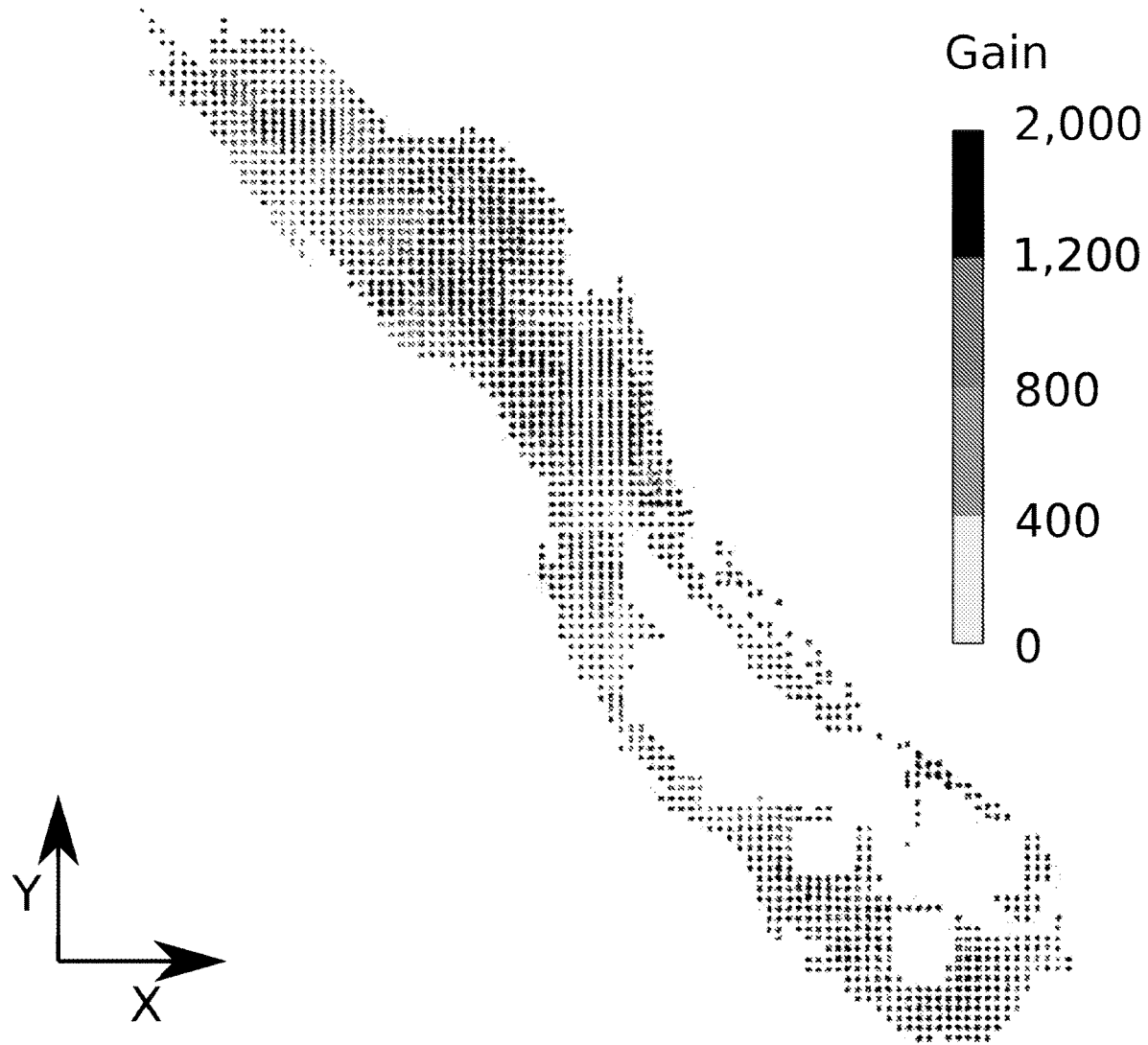
FIG. 6 shows an example (top view) of a target volume which has been segmented into sub-volumes and where gains have been associated to each sub volume. In this Figure, gains are calculated as a function of distance from existing drillholes and distance from existing sub-volumes that are classified as measured.

An example of a target volume which has been segmented into sub-volumes is shown in FIG. 6. In this figure, a target volume has been segmented into sub-volumes, and gains have been associated to each sub volume. In this figure, gains are calculated as a function of distance from existing drillholes and distance from existing sub-volumes that are classified as measured.

In certain embodiments, sub-volumes may be generally modeled as a block model, where the centroid of each block may be associated to a number of numerical parameters.

In the example illustrated in FIG. 3, the data is formatted to be compatible with the algorithmic drill hole placement component being used to perform the spatial distribution. In a non-limiting example, the sub-volume block model and associated parameters may be formatted for use by an SCP algorithm as described in, for example, *Metaheuristiques hybrids pour les problemes de recouvrement et recouvrement partiel d'ensembles appliqués au problem de positionnement des trous de forage dans les mines* (Nehme Bilal, Thesis, Ecole Polytechnique, Montreal, Canada, 2014; ISBN 9781321840629, 1321840624); herein incorporated by reference in its entirety. The output may also be modified to allow use by a deterministic solution such as the CPLEX solver, or other suitable heuristic approaches.

The graphical representations in FIGS. 4 and 5 provide a static view of the drill hole planning process, although it will be understood that the process may be run a number of times to provide a range of solutions. This range of solutions may be used to develop a sensitivity analysis—during each of the runs, one or more parameters may be modified. FIG. 3 provides a view of the iterative nature of the modeling process which incorporates both localized optimization, and using real in-field data as input into the geological targeting model as drilling progresses.

The output from the algorithmic drill hole placement component may be a proposed set of drillholes characterized by collar (start 3D coordinates) and either a trace for deviated holes or a dip/azimuth and length for straight holes. Alternatively, a straight plan may be provided as two 3D points, for example. The output may then be processed by a resource conversion classifier to determine an estimated quantity of ground that will match each of the classification criteria (i.e. inferred, indicated and measured), and a less stringent geological classification.

In certain examples, a suitable resource classifier may be commercially available software known to the person of skill in the art having regard to the teachings herein.

If grade information is available, then estimated tonnage may be calculated.

Use of a resource classifier may allow for an assessment of value (for example, either gauged by projected tons of mineralization in the resource, or by decreasing overall estimation variance). Given that mineral estimation error can be determined uniquely using the location of the samples, it is not necessary to include actual in-situ grade to determine the relative effectiveness of sampling programs. Sampling is not dependant on the grade value that is discovered in the ground. The results of the resource conversion estimate may optionally be compared to desired conversion requirements. If the conversion goals are not met, the constraint modifier may search for a combination of parameters that meet the desired conversion goals. Optionally, a user may decide which constraints they wish the constraint modifier to flex.

If the conversion goals are met, the constraint modifier may change one or more constraints and re-run the process to determine whether a "better" solution can be found. Parameters for the resource conversion may be dependent on the level of existing geological knowledge. The initial conversion criteria (i.e. geological to inferred) may be based on position of drill holes while later stage evaluation, where more data is available, may include estimated grade values to determine ore/waste estimates.

The number of processing steps, and the complexity of the targeting model, may be dependent on the amount of information that is known about the specific volume of ground being drilled. As more information is discovered, interpreted, and known, the model may evolve to ensure that constraints and goals are correctly being met. This may ensure that drill plans progress with the best alignment between what is known, and with the current exploration goals.

Example 2—Multiple Iterations Example

As described herein, methods and systems may employ an iterative or repeated approach in generating and improving drill plans. Such an approach may involve changing constraints between iterations. In embodiments, performing multiple iterations as part of the planning process may allow for both sensitivity analysis (i.e. determining which parameters most affect conversion and discovery value), and create a statistical representation of the expected outcome for the drilling program. Input for the model may be asynchronously added to the model as it becomes available either from:

Interpretation;
modeling (explicit or implicit); or
from the field or laboratory.

Figure 7:
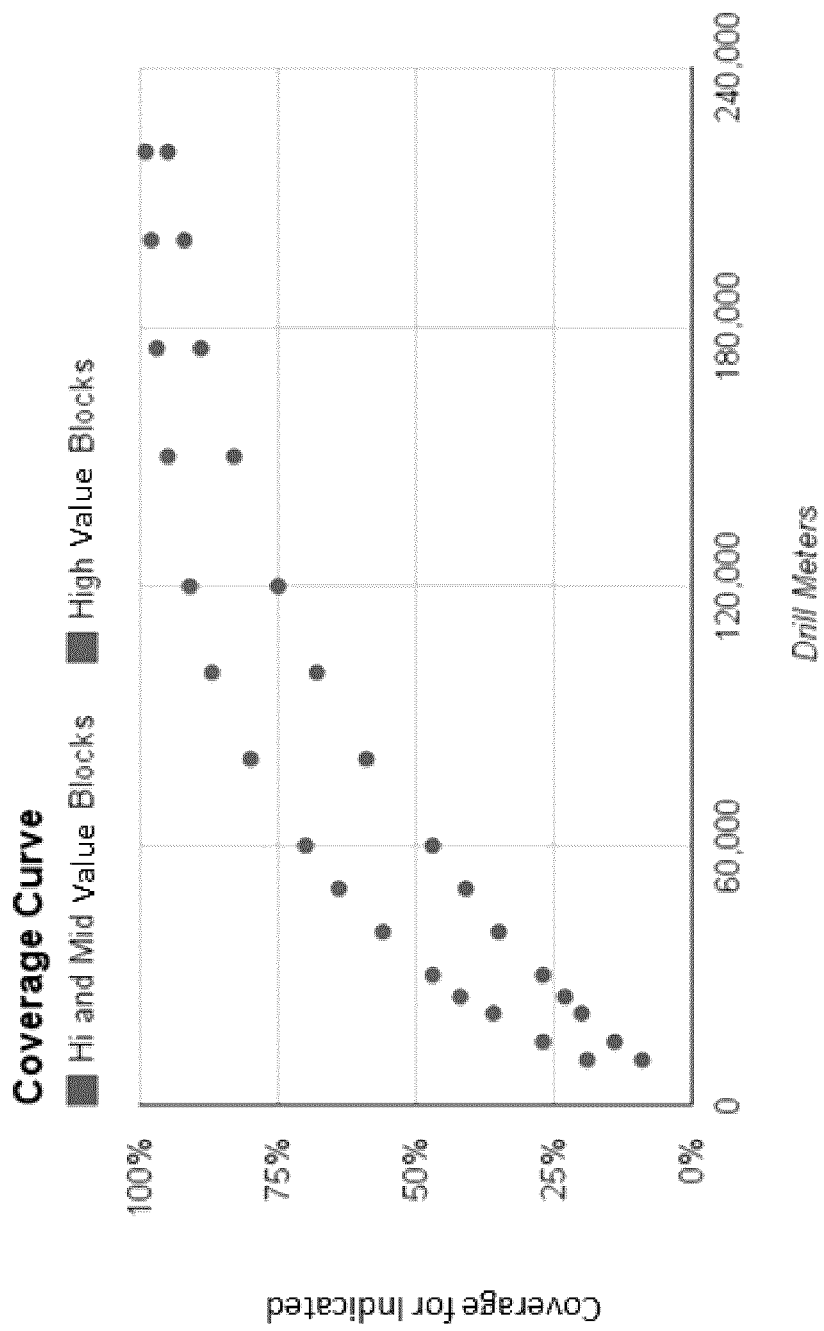
FIG. 7 shows a graph generated as part of an example in which a comparison of multiple projects or drilling configurations was performed. From left to right, the graph in FIG. 7 transitions between linear, curved and asymptotic segments. Each inflection point may demonstrate a drilling strategy change point where it may be decided whether to move forward or not. This Figure also illustrates an example of preferential targeting.

When changing a budgeting constraint, for example, given that solutions are near global optimal solutions, the speed with which the volume of interest may be converted to a higher resource classification category may be determined. The slope of the resulting curve may provide decision making insights about when and how much budget should be allocated to progress a project. The graph shown in FIG. 7 provides an example in which a means to compare multiple projects or drilling configurations is generated. As an example, adding a new type of drilling technology (such as wedged holes) may significantly improve the speed with which a target gets converted to higher classifications.

The graph in FIG. 7 can be used to make financial and/or investment decisions, for example. For a single property, it projects how quickly conversion of resource will occur for different levels of investment. Because the graph is based on global optimums and backed by the geological targeting model as described above, there may be a high level of confidence in the illustrated results in this illustrative example. It will be understood that graphs may be similarly created for more than one property, which may then be used to make financial and/or investment trade-off decisions between these different properties.

From left to right, the graph in FIG. 7 transitions between linear, curved and asymptotic segments. Each inflection point may demonstrate a drilling strategy change point where it may be decided whether to move forward or not. The blue and red lines in the graph may be used to demonstrate how an algorithmic approach as described herein may substantially improve targeting of sub-volumes with higher desirability.

Example 3—Localized Optimization and Resetting of Collar Locations Underground

Drilling companies typically need to start the drill hole (i.e. collar the hole) within a meter of a specified collar location in a drill plan. This can be a time consuming task. The methods and systems described herein may, instead, allow focus to be placed on the purpose of the drilling (i.e. what is the objective of the drill hole), and then, based on the location of the drill, determine what value may be gained or lost by resetting the location of the collar. Updating the dip and azimuth for a new collar location could be done at the face. Thus, for certain drill rigs, time required to move the head of the rig, or move the rig, to reset the collar location may be saved.

In this type of adaptable system as described herein, the hole's dip and azimuth may be recalculated to adjust to the new starting point. Presumably, for a deviated hole, the expected trajectory may be re-calculated. The recalculated solution may be provided to a Drill Rig, or the Drill Rig may be capable of recalculating the solution, or both.

Figure 8:
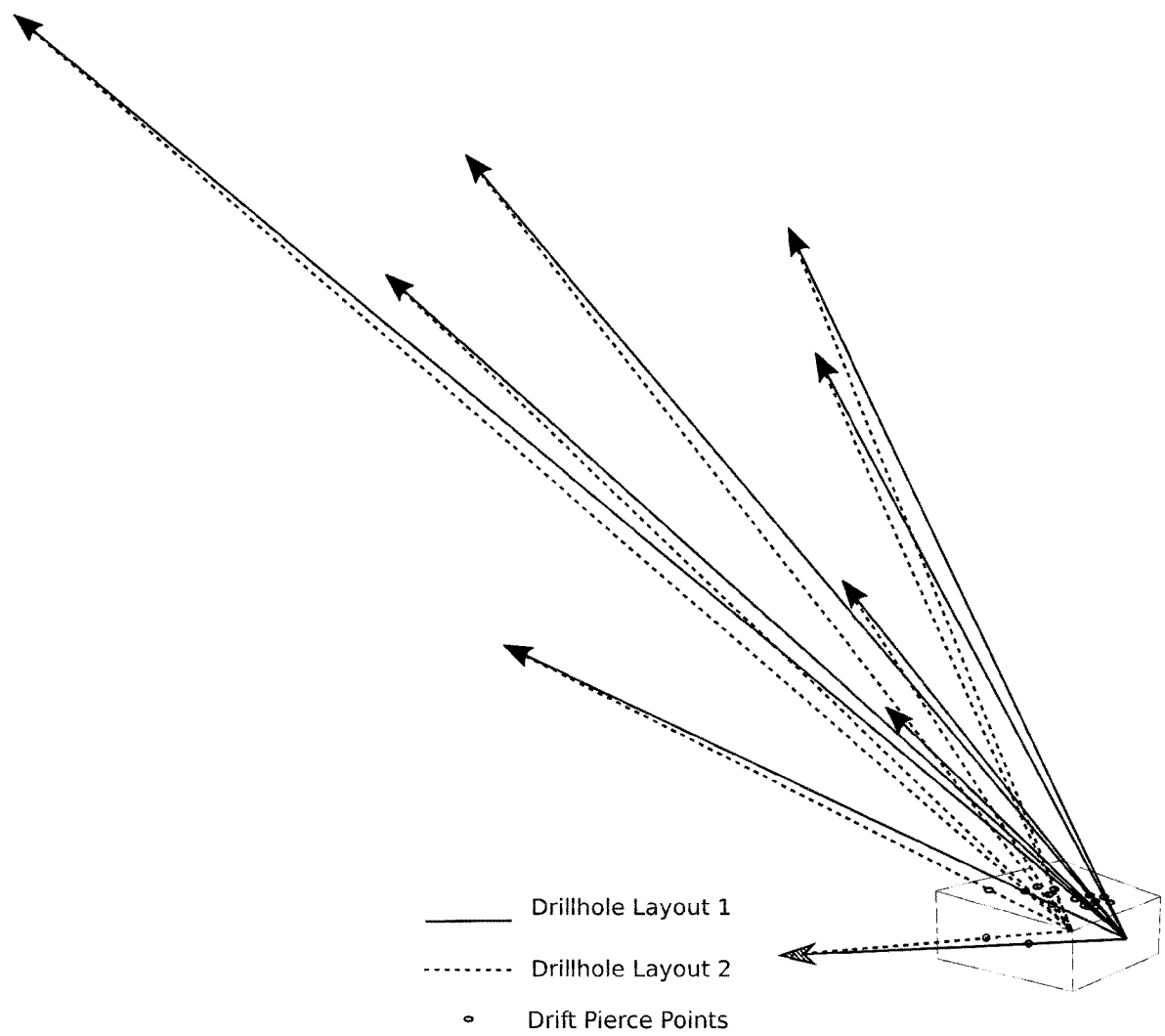
FIG. 8 shows an illustrative demonstration where collar locations have been moved back along a tunnel by 10 m. The dots show the pierce point locations on the tunnel's surface.
Figure 9:
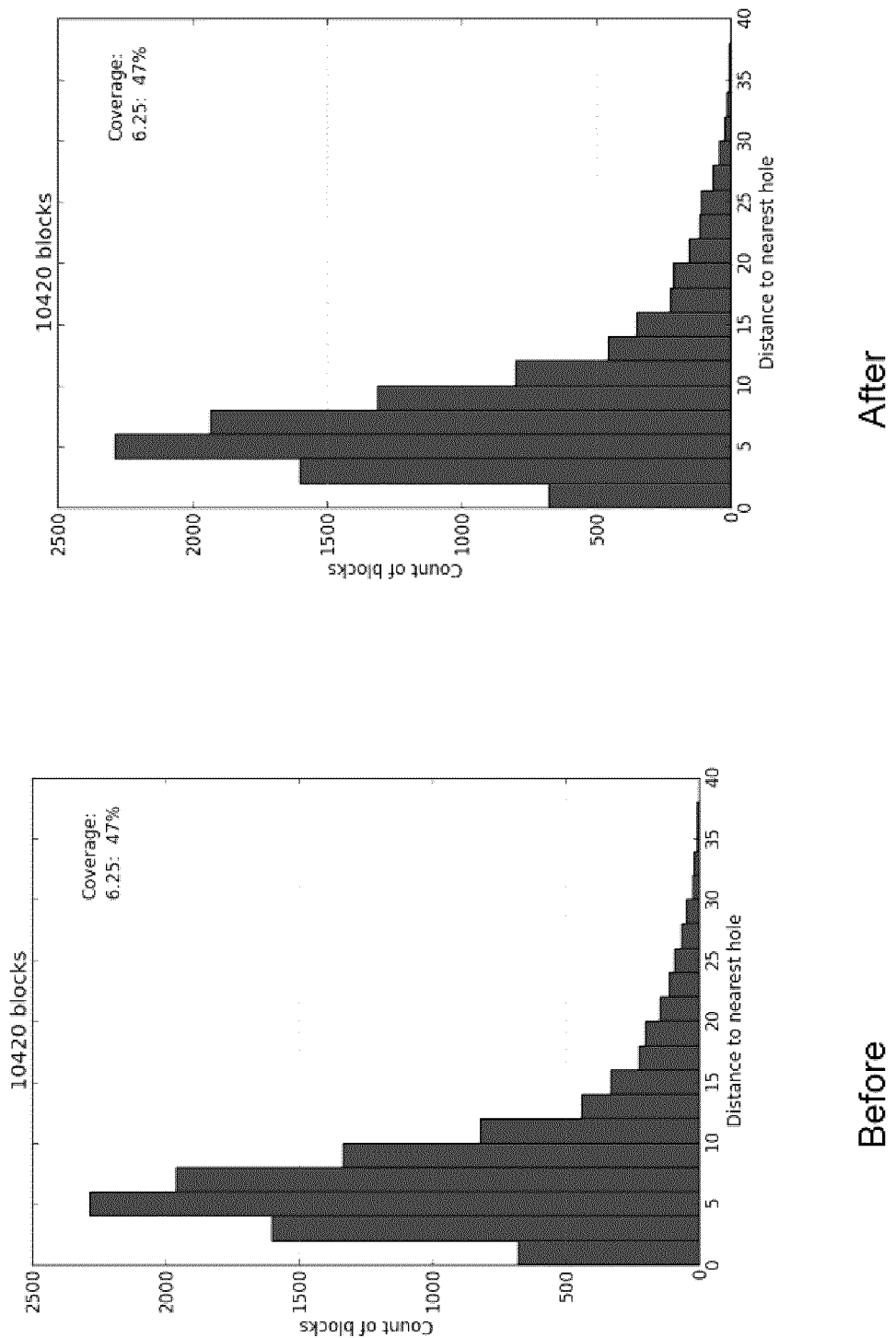
FIG. 9 shows histograms demonstrating an example in which there is little change in the spacing within the volume of interest given the change in collar location, demonstrating that drill hole density using adaptive targeting as described herein does not decrease despite a 10 m change in collaring location in this example.

An illustrative demonstration is shown in FIG. 8, where the collar locations have been moved back along a tunnel by 10 m. The dots show the pierce point locations on the tunnel's surface. 10 metre shifting is well out of compliance with the previously described 1 m requirement traditionally facing drilling companies. In addition to allowing faster setup, there may also be a direct savings of 10 m of tunnel advance (typical costs may be around $7-10K/m in development cost). The exemplified calculation assumes that the driller know some basic geometric information, such as the heading of the tunnel and the coordinates of one point in the tunnel. From there, the alternate collar coordinates may be determined and a method as described herein may then re-calculate the updated expected/planned drill traces. The histograms shown in FIG. 9 demonstrate that there is little change in the spacing/density within the volume of interest given the "significant change" in collar location, demonstrating that drill hole spacing using adaptive targeting as described herein does not decrease despite a 10 m change in collaring location in this example.

Figure 13:
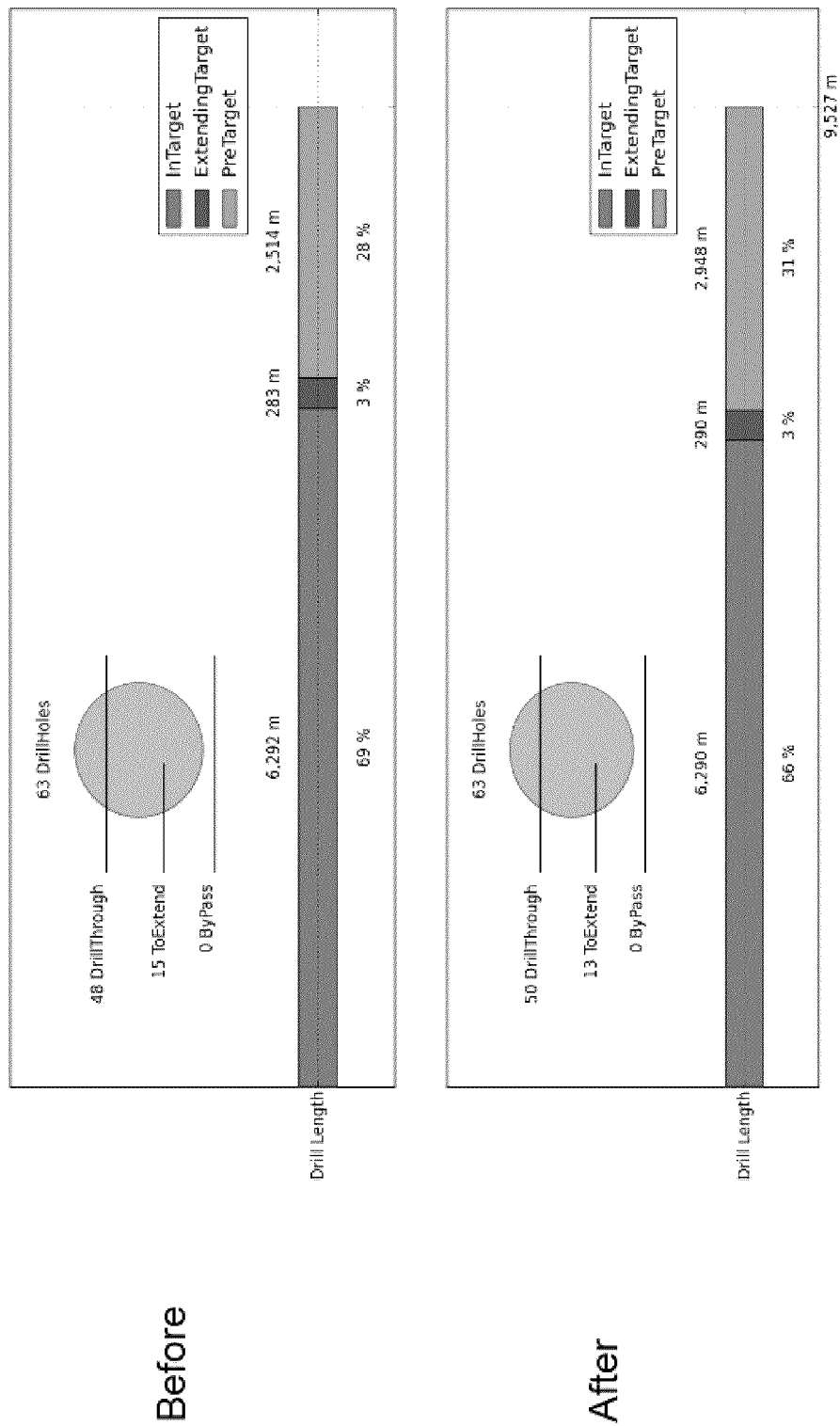
FIG. 13 shows graphical representations of summaries of starting and new layouts, including information regarding the number of drill holes, the type of drill holes, in target versus out of target data, and the drill length, as described in non-limiting illustrative Example 3.

A summary of the starting and new layouts, including information regarding the number of drill holes, the type of drill holes, and the drill length was also prepared (see FIG. 13).

Example 4—Comparison Examples

Figure 10:
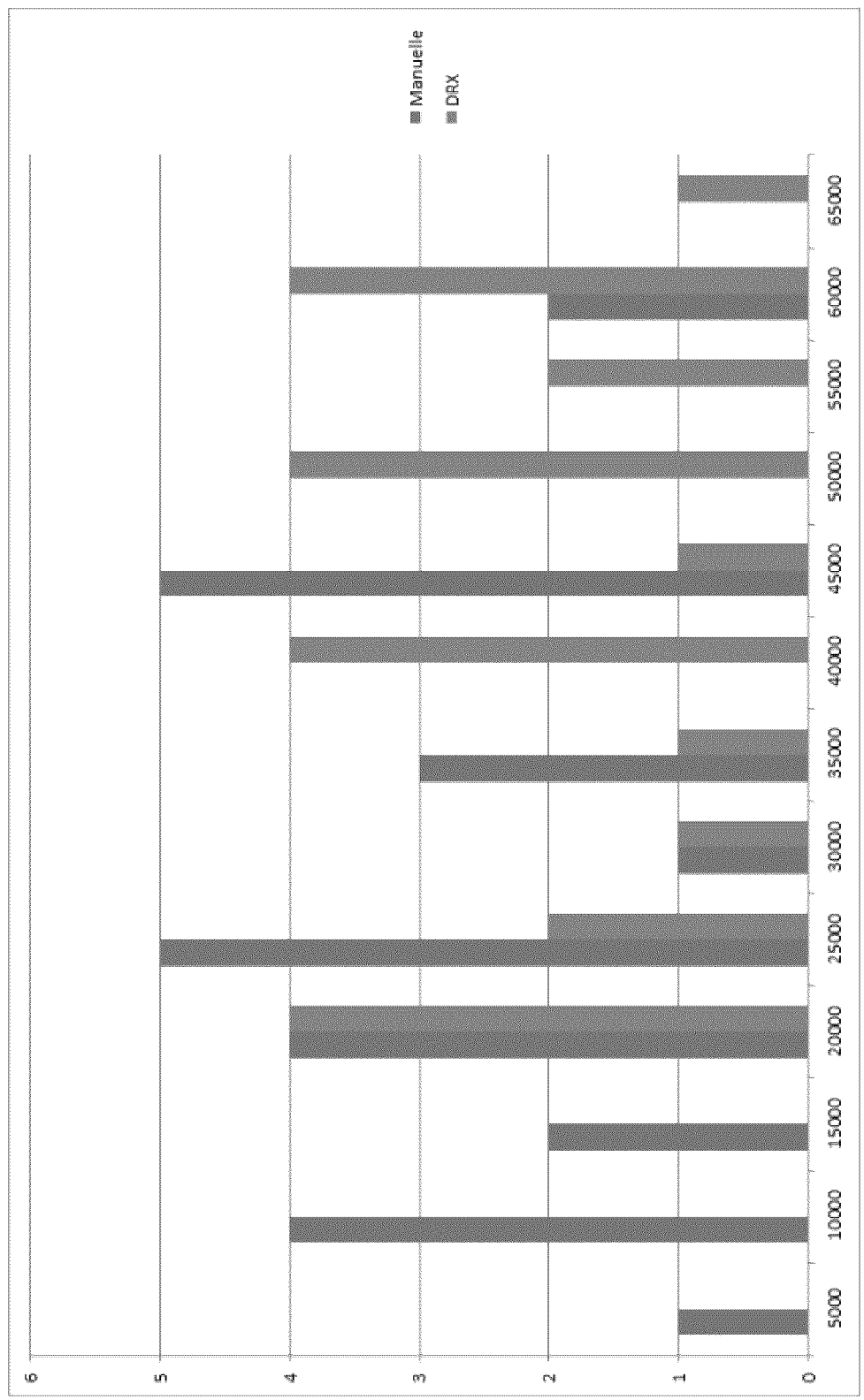
FIG. 10 shows a histogram showing comparison of both a manual plan and a plan generated using methods as described herein. The bins are value produced by hole. The height of each bar indicates how many holes, of a given value, are included in the drill plans.
Figure 11:
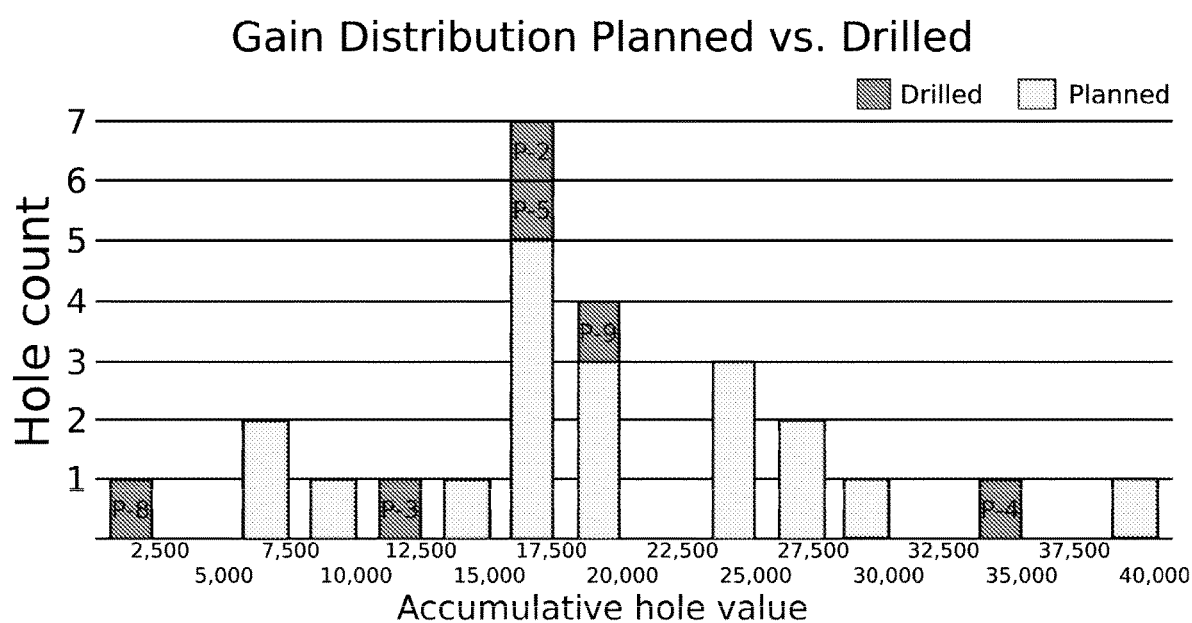
FIG. 11 shows a histogram showing comparison of both a manual plan and a plan generated using methods as described herein. When drilling begins, how each of the drill holes ranks compared to the expected distribution can be determined. 6 holes drilled in the drill plan are shown.

Since each of the drill holes may be ranked by the volume of ground that it is qualifying or discovering, this may allow assessment of the relative value between drilling programs (i.e. drill plans) for the aggregate of all holes. The full value that a drilling program provides may thus be determined. Perhaps more interesting, however, is to determine the relative loss or gain to the program produced by each drill hole. In the following illustrative and non-limiting example, two histograms showing comparison of both a manual plan and a plan generated using methods as described herein are described. These histograms are illustrated in FIGS. 10 and 11. The bins are value produced by hole. The height of each bar indicates how many holes, of a given value, are included in the drill plan. (i.e. there is one manual hole that generates 5,000 units of goodness (as shown in, for example, FIG. 6 scale, right of image)—left most hole on the histogram in FIG. 10). Analysing the graph allows determination that the drill holes of the plan generated using methods as described herein are, on average, more productive than the manual holes (i.e. there is more orange to the right of the graph). In this example, the median hole of the plan produced using methods as described here produces 45,000 units of goodness. There are only 7 manual holes that are at this median (as compared with 12 holes of the plan generated using methods as described herein).

When drilling begins, how each of the drill holes ranks compared to the expected distribution can be determined. The graph shown in FIG. 11 shows 6 holes drilled in the drill plan. P-8 is a very low value drill hole which is a manually planned hole. The highest value in the program, based on the geological targeting model used, is to drill the drill holes in order from right to left. There are 7 holes that would have been more valuable than P9 to meet the overall objective as defined in the drill program. Any of the holes shown would have been more valuable than the manually planned P8. By not drilling this order and by drilling manual holes, there is a net loss to the overall value of the drilling program as shown. With methods as described herein, relative value lost or gained may be determined. In the illustrated example, the company should, given physical constraints, begin drilling all holes to the right of the median holes located at 20,000 units of goodness in order to maximize the value of the drill program. A review to determine why the P-8 hole was drilled may also be done, as it may affect the geological targeting model's premise in this illustrative example.

Example 5—Additional Decision Criteria, Constraints, Methods, and Systems for Drill Plan Generation and Optimization Another example of a method as described herein which provides non-limiting examples of suitable decision criteria and/or constraints which may be used or considered in the generation and/or optimization of a drill plan is described in further detail below with reference to FIG. 12.

Figure 12:
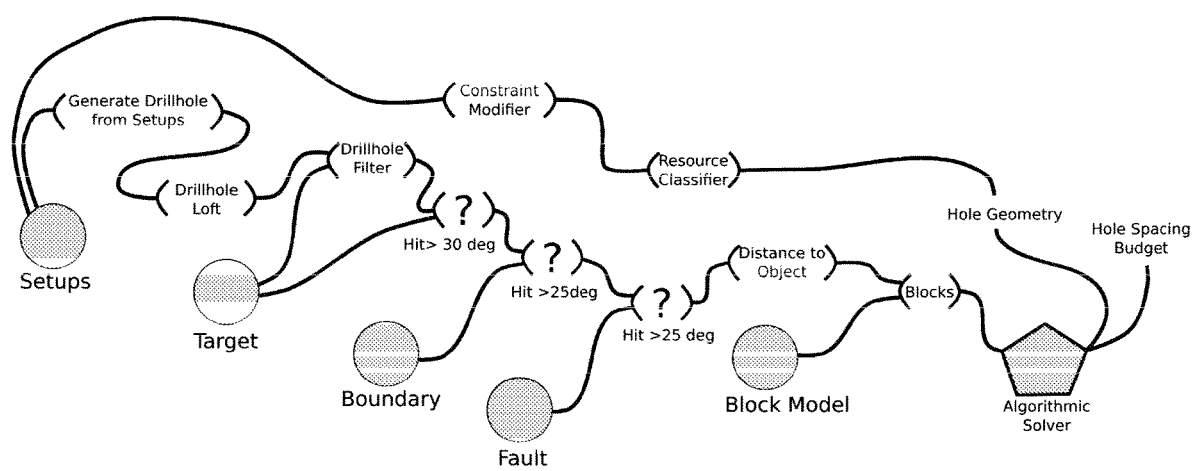
FIG. 12 shows a bubble flow diagram representing an embodiment of a method as described herein in which examples of physical geological features, decision criteria, and constraints which may be used or considered in creating a drill plan are depicted.

In the bubble flow diagram depicted in FIG. 12, circled balls indicated with arrows represent examples of geometric and/or volumetric inputs used in a geological targeting model for generating a drill plan using an algorithmic solver. Each ball may represent one, or more than one input. By way of example, the "fault" ball may represent one or multiple inputs relating to one or more than one fault.

The algorithmic solver of the exemplified method is shown on the far right of FIG. 12. The algorithmic solver of the exemplified method may be an algorithmic solver such as is described in *Metaheuristiques hybrids pour les problemes de recouvrement et recouvrement partiel d'ensembles appliqués au problem de positionnement des trous de forage dans les mines* (Nehme Bilal, Thesis, Ecole Polytechnique, Montreal, Canada, 2014; ISBN 9781321840629, 1321840624) (herein incorporated by reference in its entirety), or an algorithmic solver such as is described herein. In certain examples, a constraint modifier may flex or modify constraint parameters/values, and the algorithmic solver may determine how the output (i.e. the drill plan) is affected by this flexing or modifying in an iterative approach, allowing determination of how alternative drill plans affect the classification of the target volume. In this regard, a resource conversion calculator may be employed for assessing classification of the target volume.

Example 6—Drill Time Reduction

A non-limiting example of showing a number of generated plans evaluating drilling constraints, drilling technology (mobile drill rigs), and total time required to drill the program using an example of method and system as described herein, as compared to an initial manual drill plan, is described in further detail below with reference to FIG. 14 and FIG. 15.

In this illustrative and non-limiting example, total estimated drilling times and performance are compared between drill plans generated manually and by two alternative configurations (Solution 1 and Solution 2) of methods as described herein. Solution 1 further demonstrates the value that can be gained by using a high mobility drill rig. Drill plans are generated using the same initial drilling locations for all 4 examples. As can be seen in FIG. 14, all 3 drill plans generated using methods described herein result in either decreased drilling aggregate length or increased expected coverage/conversion.

The "Solution 1 with High Mobility rigs" demonstrates the value of a high mobility drill rig providing the capability of quickly aligning holes. Although the aggregate number of metres and the expected coverage do not change, the total time taken to drill the program decreases when compared to any other solution and in particular to Solution 1 which uses the same drill plan.

The timing values used in this non-limiting example for all drill plans were created using simplified assumptions. Calculated time ranges are proportional and generally comparable to the time taken to drill a 14 km program. Dates are only used for reference purposes.

These results in this example demonstrate that methods as described herein may be used to access the value of changing drilling technologies.

Furthermore this example demonstrates how a timing criteria can be added to determine additional drill program benefits, and to ensure that a drill program can be completed within timing constraints, such as drill site/setup availability.

Figure 14:
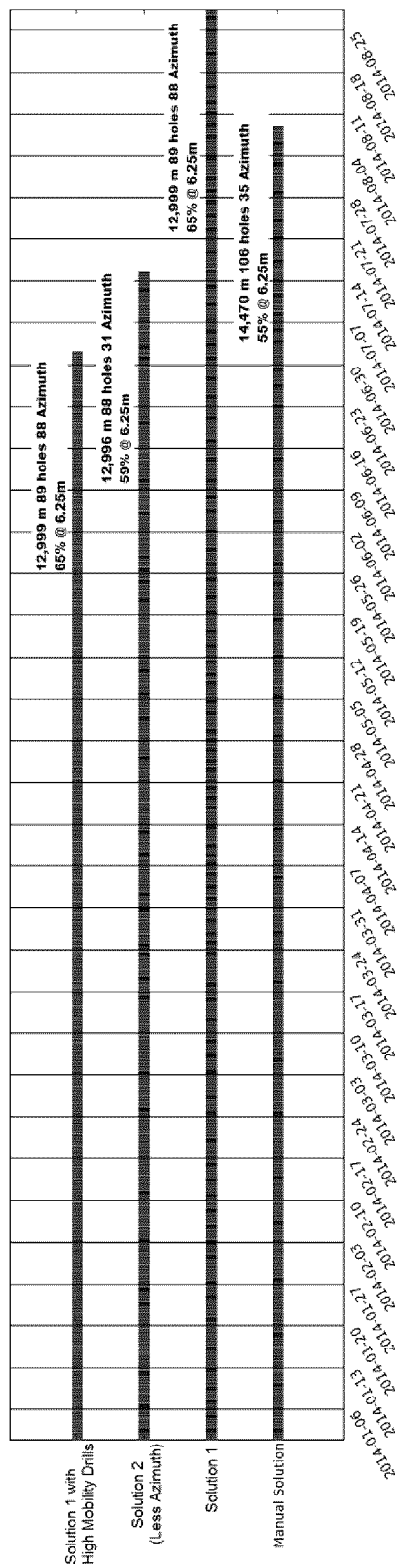
FIG. 14 shows a graphical representation of predicted characteristics of drill plan solutions generated either manually or using a method as described herein, as described in Example 6. Characteristics relating to the non-limiting illustrative example described in Example 6, including predicted drilling time, total drill hole length, total number of drill holes, and % coverage, are indicated.
Figure 15:
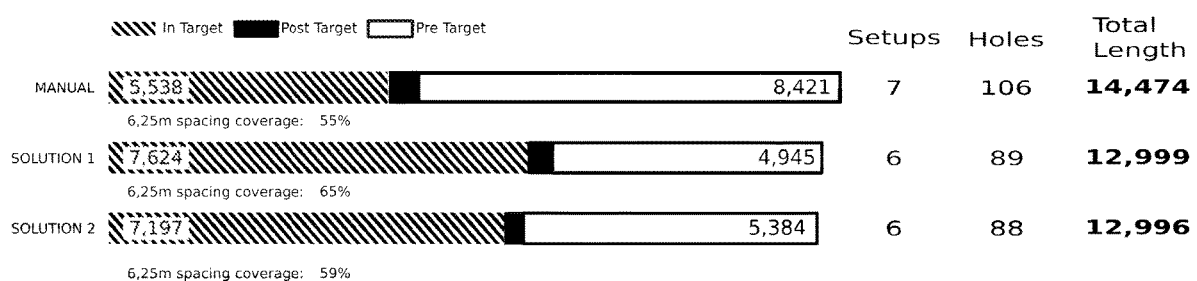
FIG. 15 shows a graphical representation of performance indicators related to the amount of aggregate meters drilled in the target volume vs. aggregate meters to access the target volume, as described in Example 6.

FIG. 15 complements FIG. 14, provides further performance indicators directly related to the amount of aggregate metres drilled in the target volume (green; left end of bars) vs. aggregate metres (grey; right end of bars) in order to access the target volume. Expected coverage/conversion numbers, setup locations and total aggregate drilled metres are also provided. In this Figure, Solution 1 and Solution 2 are the same solution, however Solution 2 uses a high mobility drill whereas Solution 1 uses a lower mobility drill. Comparing coverage/conversion figures between Solution 1 and Solution 2 demonstrates the value of un-constraining the azimuth, generating a 10% increase in coverage/conversion.

Figure 16:
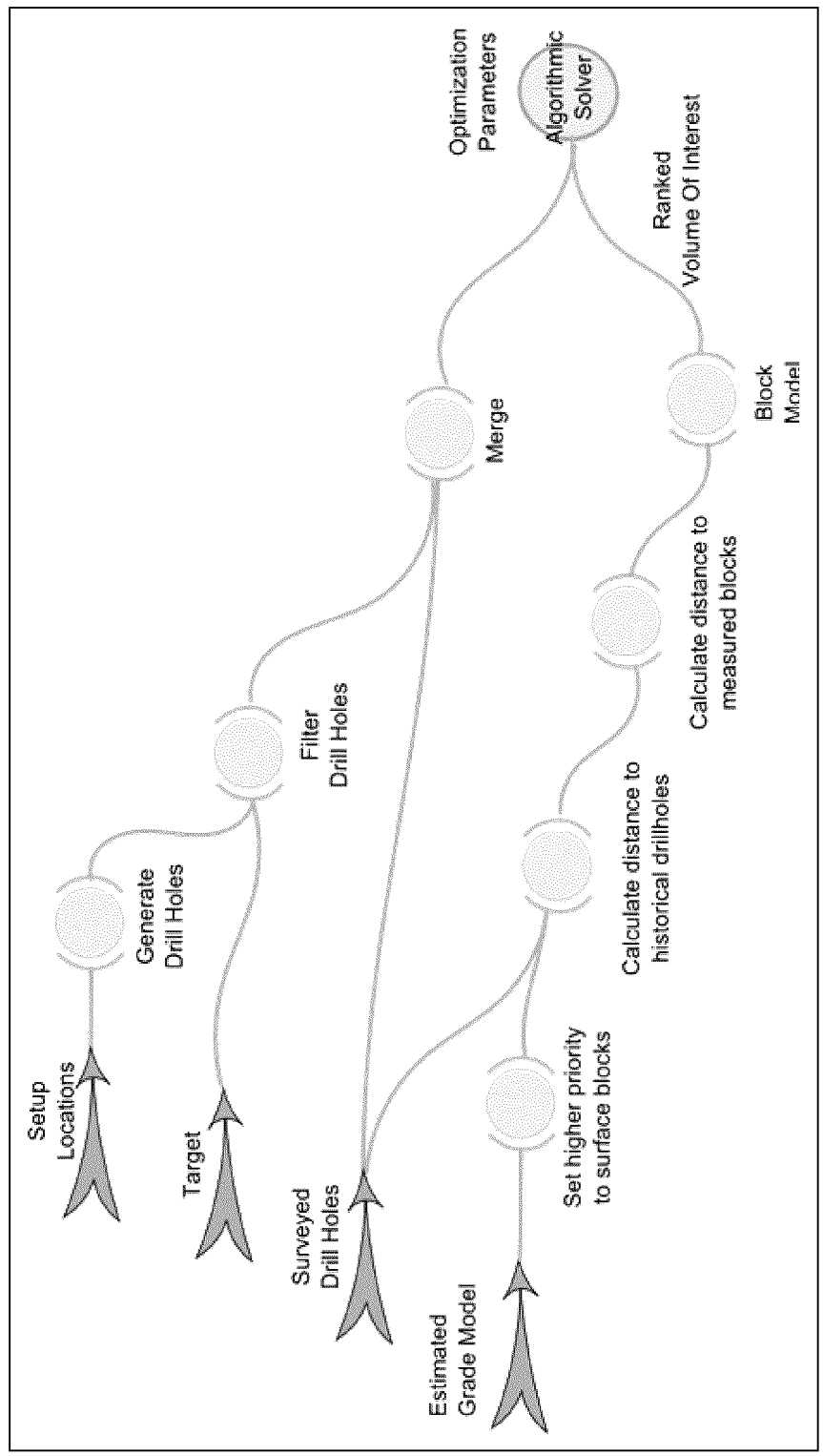
FIG. 16 shows a data flow diagram corresponding to the method used to generate drill plan solutions of Example 6.

FIG. 16 provides a data flow diagram corresponding to the method used in this Example.

One or more illustrative embodiments have been described by way of example. It will be understood to persons skilled in the art that a number of variations and modifications can be made without departing from the scope of the invention as defined in the claims.

What is claimed is:

1. A computer-implemented method for improving mineral resource exploration and resource classification efficiency, said computer-implemented method comprising:
    defining a one or more target volumes of interest in 3D space;
    segmenting the one or more target volumes into sub-volumes to which one or more attributes indicating relative desirability may be assigned; and
    iteratively generating and improving a drill plan using an algorithmic solver executed by a processor, wherein the drill plan aims to provide an optimal or near optimal solution for drill hole distribution within the one or more target volumes such that all or nearly all the sub-volumes, or at least the sub-volumes of greatest desirability, of the one or more target volumes are sampled to a specified or desired level, including obtaining information from a drill rig to be supplied to the algorithmic solver for the iteratively generating;

graphically presenting the drill plan using an interface communicatively connected to the processor, wherein the resulting drill plan comprises a collection of one or more planned drill holes which are defined in 3D space, wherein a set of operational constraints constrains the iteratively generated and improved drill plan, and wherein the sub-volumes are blocks, and the algorithmic solver aims to generate a drill plan which attempts to maximize the number of blocks sampled by the drill holes of the drill plan while minimizing the total planned drill length of the drill plan, wherein the resulting drill plan is for identifying drill holes to be drilled by drilling equipment, wherein an orientation of a drill hole of the drill plan can be recalculated in real-time to accommodate for on-site drilling limitations, and wherein the on-site drilling limitations are any one of drill site accessibility, drill hole geometry, drill hole timing limitations, a requirement for movement of the drill rig, setup availability, or any combination thereof, and wherein a completion constraint is used to identify a point at which sufficient drilling has been completed, and wherein the point at which sufficient drilling has been completed is the point at which further increase in drill hole density provides additional value which is below a specified threshold.

2. The method according to claim 1, wherein the set of operational constraints comprises a historical drill hole locations constraint, a potential drilling setup location constraint, a drilling direction constraint, a drilling dips constraint, a drilling azimuth constraint, a drilling budget constraint, a sampling requirement constraint, a drilling setup availability constraint, a constraint regarding distribution of drill holes from setups, a constraint regarding the total amount of surface ground disturbance, a topographical constraint, an environmental constraint, a constraint regarding environmental exclusion zones, a geological fault constraint, a geological contacts constraint, a geological structure constraint, or a constraint regarding existing underground workings or operations, or any combination thereof.

3. The method according to claim 1, wherein the algorithmic solver is based on a heuristic algorithm, a linear algorithm, a metaheuristic algorithm, a metaheuristic SCP algorithm, a localized random search, a modified random search, an annealing algorithm, a taboo search, or a multiple metaheuristic algorithm comprising a genetic algorithm component, a taboo search algorithm and an iterated local search algorithm.

4. The method according to claim 1, wherein the one or more attributes indicating relative desirability of a sub-volume are selected from one or more of:
distance of the sub-volume from an existing drill hole;
estimate variance;
grade estimates;
bounding of the sub-volume by site specific geological contacts, structures, or faults; or
variability or uncertainty of sub-volume grade estimation or interpolation.

5. The method according to claim 1, wherein the drill plan aims to sample sub-volumes of the one or more target volumes such that a highest aggregate desirability is achieved, wherein aggregate desirability primarily considers a value of resource classification, an identification of geological features bounding the one or more target volumes, or a combination thereof.

6. The method according to claim 1, wherein the drill plan is iteratively improved by improving the global distribution of drill holes within the drill plan based on newly acquired information as drilling operations progress.

7. The method according to claim 1, wherein the specified or desired level is selected from a range spanning geological, inferred, indicated, measured resource, and probable or proven reserve.

8. The method according to claim 7, wherein the specified or desired level is at least about 60% indicated while minimizing measured.

9. The method according to claim 1, wherein the algorithmic solver aims to generate a drill plan which attempts to maximize a number of sub-volumes sampled or classified per unit of planned drill length.

10. The method according to claim 1, wherein the drill plan provides a ranking for each planned drill hole which is based on a relative value of each planned drill hole to an overall drill plan, and wherein one or more of the lowest ranked drill holes are eliminated from the drill plan.

11. The method according to claim 10, wherein the ranking includes a penalty for moving a drill hole of the drill plan away from a position at the one or more target volumes which is easily drilled, or away from a position at the one or more target volumes at which drilling equipment is already located.

12. The method according to claim 10, wherein the relative value to the drill plan of changing one or more collar locations while dynamically updating dip and dip direction is assessed.

13. The method according to claim 1, wherein the iteratively generated drill plans are scored by a resource conversion calculator, and the algorithmic solver improves a drill plan score using one or more parameters which are changed using a constraint modifier between iterations, and wherein the constraint modifier changes or flexes one or more parameters selected from a historical drill hole locations constraint, a potential drilling setup location constraint, a drilling direction constraint, a drilling dips constraint, a drilling azimuth constraint, a drilling budget constraint, a sampling requirement constraint, a drilling setup availability constraint, a constraint regarding distribution of drill holes from setups, a constraint regarding the total amount of surface ground disturbance, a topographical constraint, an environmental constraint, a constraint regarding environmental exclusion zones, a geological fault constraint, a geological contacts constraint, a geological structure constraint, or a constraint regarding existing underground workings or operations, or any combination thereof, the specified or desired level, or a combination thereof, between iterations.

14. The method according to claim 13, wherein the scoring of the drill plans includes rewarding drill plans which provide information about location of geological structures and contacts of the one or more target volumes, or rewarding drill plans which have a reasonable probability of success.

15. The method according to claim 1, wherein the method is an iterative method which is repeated using input which is based on newly acquired information obtained from drilling one or more planned drill holes from a previously generated drill plan, wherein the one or more planned drill holes from the previously generated drill plan are drill holes which have been drilled quickly but with reduced precision for geological drilling or bounding of the one or more target volumes, allowing in-fill planning, and improving the drill plan with less invested time.

16. The method according to claim 1, wherein the method further comprises:
   using implicit modeling to model geological contacts, faults, shells, and surfaces; and
   updating the implicit modeling of the one or more target volume surfaces, geological structures, geological contacts, or a combination thereof, as drill hole data is acquired,
   thereby dynamically identifying sub-volumes of greatest desirability to be converted from unclassified to geological, inferred, indicated, or measured, and wherein the drill plan is recalculated and the scoring of the resulting drill plan includes a reward for solutions which allow for conversion of the identified sub-volumes of greatest desirability from unclassified to inferred, indicated or measured.

17. The method according to claim 1, wherein drill holes of the drill plan are ranked based on their value to the drill plan, and this ranking is used to indicate which holes of the drill plan should be drilled first.

18. A computer system for improving mineral resource exploration and resource classification efficiency by generation and improvement of a drill plan, said computer system comprising:
   a memory for storing program instructions; and
   a processor for executing the program instructions;
   wherein the program instructions comprise instructions for:
      defining one or more target volumes of interest in 3D space;
      segmenting the one or more target volumes into sub-volumes to which one or more attributes indicating relative desirability may be assigned; and
      iteratively generating and improving a drill plan using an algorithmic solver, wherein the drill plan aims to provide an optimal or near optimal solution for drill hole distribution within the one or more target volumes such that all or nearly all the sub-volumes, or at least the sub-volumes of greatest desirability, of the one or more target volumes are sampled to a specified or desired level, including obtaining information from a drill rig to be supplied to the algorithmic solver for the iteratively generating;
   wherein the resulting drill plan comprises a collection of one or more planned drill holes which are defined in 3D space, and
   wherein a set of operational constraints constrains the iteratively generated and improved drill plan; and
   wherein the computer system comprises an interface for graphically presenting the drill plan and for receiving input of user-defined target volume of interest parameters, operational constraint parameters, or a combination thereof,
   wherein the resulting drill plan is for identifying drill holes to be drilled by drilling equipment,
   wherein an orientation of a drill hole of the drill plan can be recalculated in real-time to accommodate for on-site drilling limitations, and wherein the on-site drilling limitations are any one of drill site accessibility, drill hole geometry, drill hole timing limitations, a requirement for movement of the drill rig, setup availability, or any combination thereof, and
   wherein a completion constraint is used to identify a point at which sufficient drilling has been completed, and wherein the point at which sufficient drilling has been completed is the point at which further increase in drill hole density provides additional value which is below a specified threshold.

* * * * *